United States Patent
Takahashi

(10) Patent No.: US 9,170,664 B2
(45) Date of Patent: Oct. 27, 2015

(54) INFORMATION PROCESSING SYSTEM

(75) Inventor: Masaki Takahashi, Kanagawa (JP)

(73) Assignees: Sony Corporation, Tokyo (JP); Sony Computer Entertainent Inc., Tokyo (JP)

(*) Notice: Subject to any disclaimer, the term of this patent is extended or adjusted under 35 U.S.C. 154(b) by 568 days.

(21) Appl. No.: 13/230,293

(22) Filed: Sep. 12, 2011

(65) Prior Publication Data

US 2012/0065917 A1    Mar. 15, 2012

(30) Foreign Application Priority Data

Sep. 14, 2010   (JP) .................... 2010-206008

(51) Int. Cl.
*G06F 3/038* (2013.01)
*G06F 3/0346* (2013.01)
*A63F 13/211* (2014.01)
(Continued)

(52) U.S. Cl.
CPC .............. *G06F 3/038* (2013.01); *A63F 13/211* (2014.09); *A63F 13/217* (2014.09); *A63F 13/22* (2014.09); *G06F 3/0346* (2013.01)

(58) Field of Classification Search
CPC ................... A63F 2300/106; A63F 2300/105; A63F 13/211; A63F 13/217; A63F 13/22; H04Q 2209/84
USPC ........................................................ 702/104
See application file for complete search history.

(56) References Cited

U.S. PATENT DOCUMENTS 5,525,901 A    6/1996 Clymer
5,615,132 A    3/1997 Horton
(Continued)

FOREIGN PATENT DOCUMENTS

CN    1317984 A    10/2001
CN    1774206 Y    5/2006
(Continued)

OTHER PUBLICATIONS

Radio-Electronics.com "Mobile phone network registration." [online] Aug. 22, 2006. [Retrieved from http://web.archive.org/web/20060822131710/http://www.radio-electronics.com/info/cellulartelecomms/cellular_concepts/registration.php] [Retrieved on Oct. 21, 2013].*

(Continued)

*Primary Examiner* — Sujoy Kundu
*Assistant Examiner* — Liam R Casey
(74) *Attorney, Agent, or Firm* — Matthew B. Dernier, Esq.

(57) ABSTRACT

An information processing system, including: a portable communication device including a sensor that measures predetermined information and outputs a measurement result, the sensor having output characteristics varying depending on a place of use; and a information processing device for indoor use, which is communicatively connectable to the portable communication device, the information processing device being configured to: acquire the measurement result of the sensor from the communicatively-connected portable communication device; execute calibration of the sensor by using the acquired measurement result; execute an application program that uses the measurement result of the sensor; and performs determination as to whether or not the calibration has been executed for the communicatively-connected portable communication device when the application program is executed.

9 Claims, 17 Drawing Sheets

(51) Int. Cl.
*A63F 13/22* (2014.01)
*A63F 13/217* (2014.01)

(56) References Cited

U.S. PATENT DOCUMENTS

| | | |
|---|---|---|
| 7,251,493 B2 | 7/2007 | Camp, Jr. |
| 7,843,429 B2 | 11/2010 | Pryor |
| 2005/0181810 A1 | 8/2005 | Camp, Jr. |
| 2006/0109242 A1 | 5/2006 | Simpkins |
| 2006/0112754 A1 | 6/2006 | Yamamoto |
| 2006/0258454 A1* | 11/2006 | Brick .............................. 463/36 |
| 2007/0060336 A1 | 3/2007 | Marks |
| 2007/0285386 A1 | 12/2007 | Lim et al. |
| 2008/0120057 A1* | 5/2008 | Fukushima et al. .......... 702/104 |
| 2008/0172174 A1 | 7/2008 | Okeya |
| 2008/0287189 A1 | 11/2008 | Rabin |
| 2010/0001953 A1 | 1/2010 | Yamamoto |
| 2010/0303297 A1* | 12/2010 | Mikhailov et al. ............ 382/103 |
| 2011/0034244 A1 | 2/2011 | Marks et al. |
| 2011/0039576 A1* | 2/2011 | Prakash et al. ............. 455/456.1 |
| 2012/0004035 A1 | 1/2012 | Rabin |

FOREIGN PATENT DOCUMENTS

| | | |
|---|---|---|
| CN | 1923326 A | 3/2007 |
| CN | 101340450 A | 1/2009 |
| CN | 101578570 A | 11/2009 |
| CN | 101648076 A | 2/2010 |
| CN | 201403149 Y | 2/2010 |
| JP | 2006271572 A | 10/2006 |
| JP | 2007522471 A | 8/2007 |
| JP | 4288482 B2 | 7/2009 |

OTHER PUBLICATIONS

Office Action for related U.S. Appl. No. 13/230,283 dated Apr. 25, 2013.

Office Action for related U.S. Appl. No. 13/230,283, dated Nov. 19, 2013.

Office Action and a Search Report for corresponding Chinese Patent Application No. 201110271147.0, dated Sep. 30, 2013.

Office Action and a Search Report for corresponding Chinese Patent Application No. 2011102705802, dated Nov. 5, 2013.

U.S. Office Action for related U.S. Appl. No. 13/230,283, dated Mar. 26, 2014.

Office Action for corresponding CN Patent application No. 1201110271147.0, dated Jun. 24, 2014.

* cited by examiner

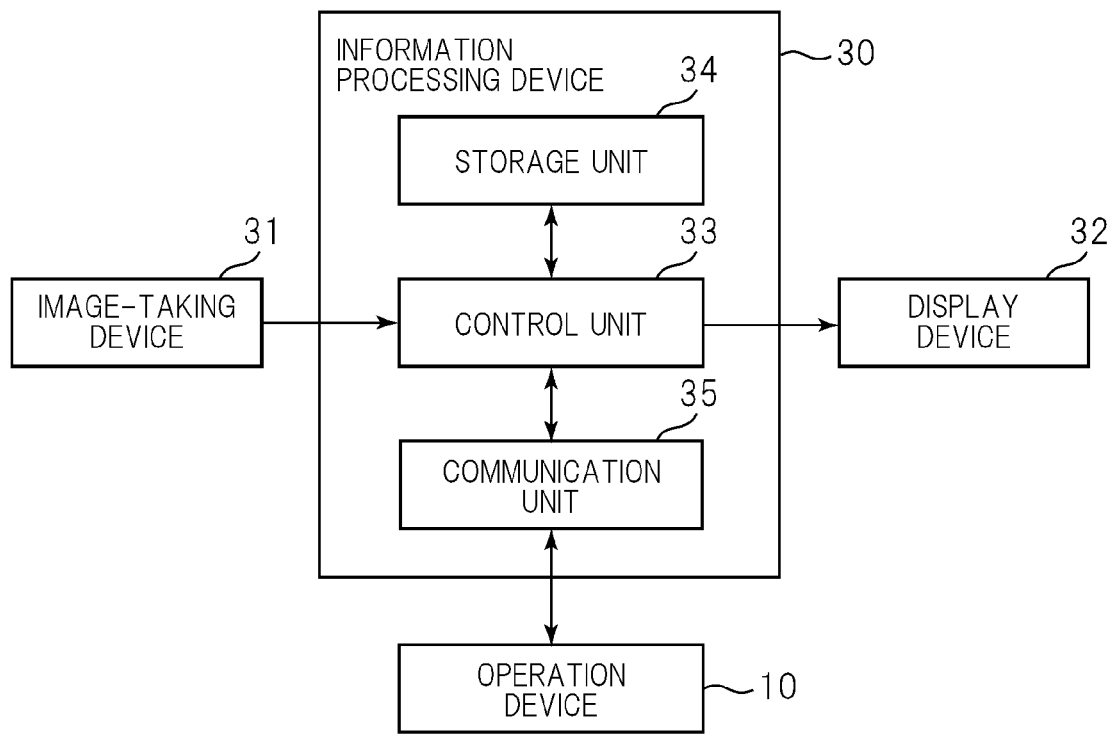
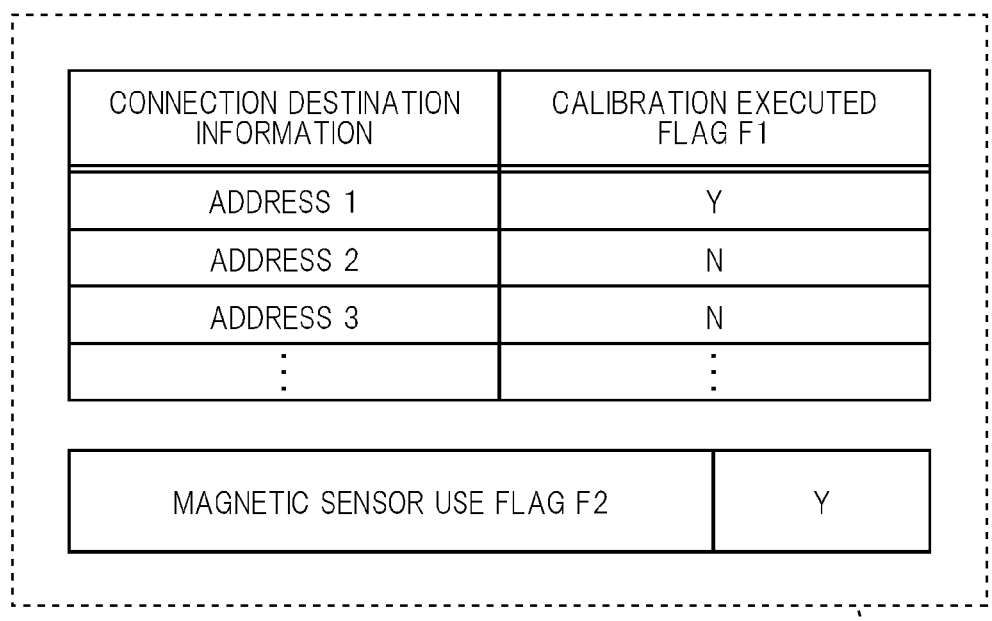

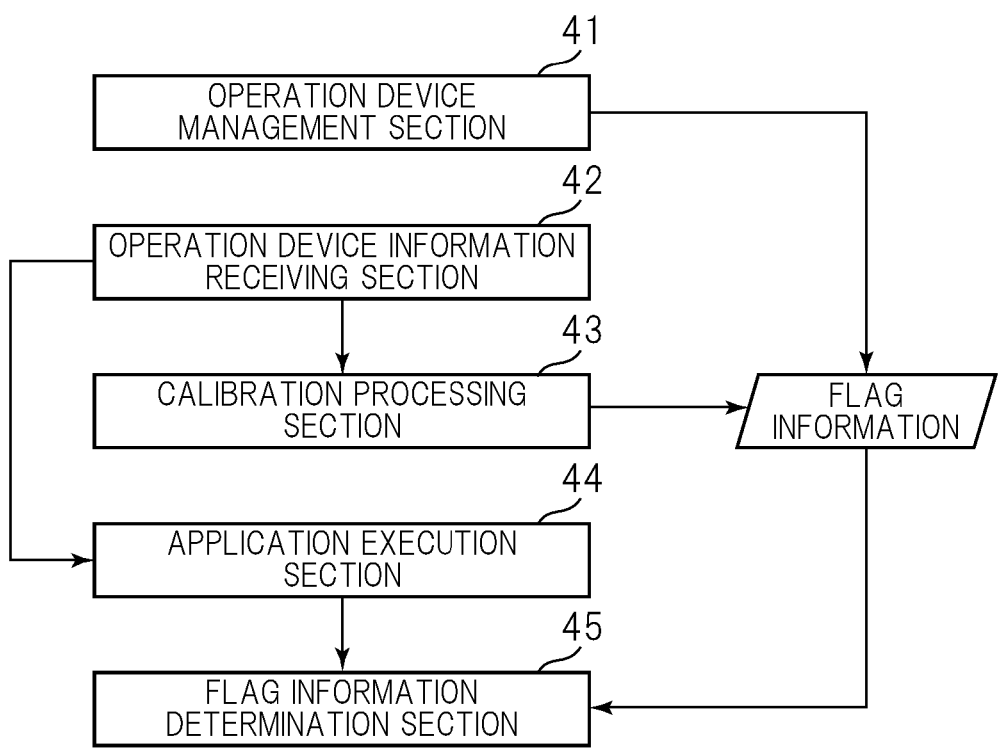

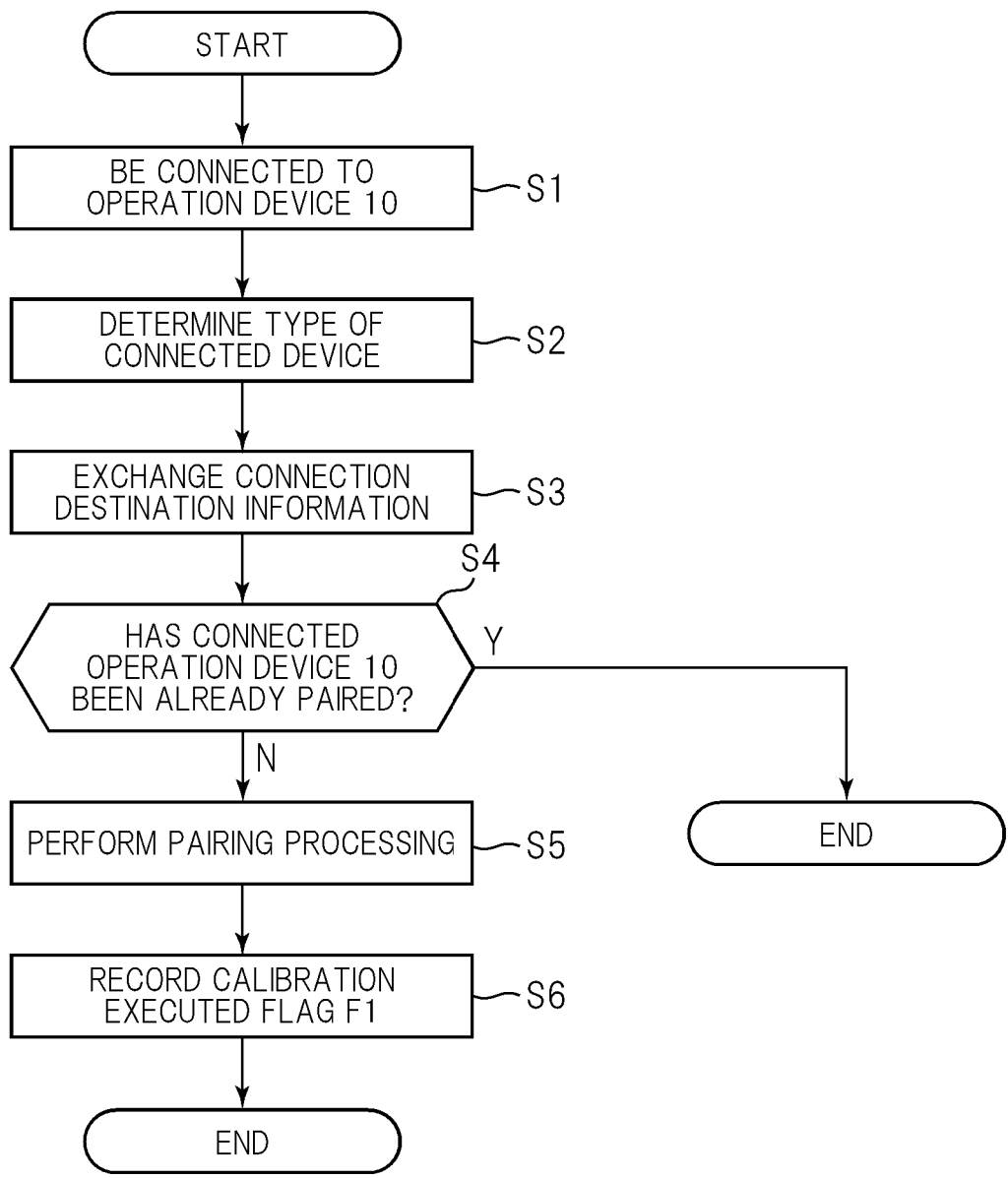

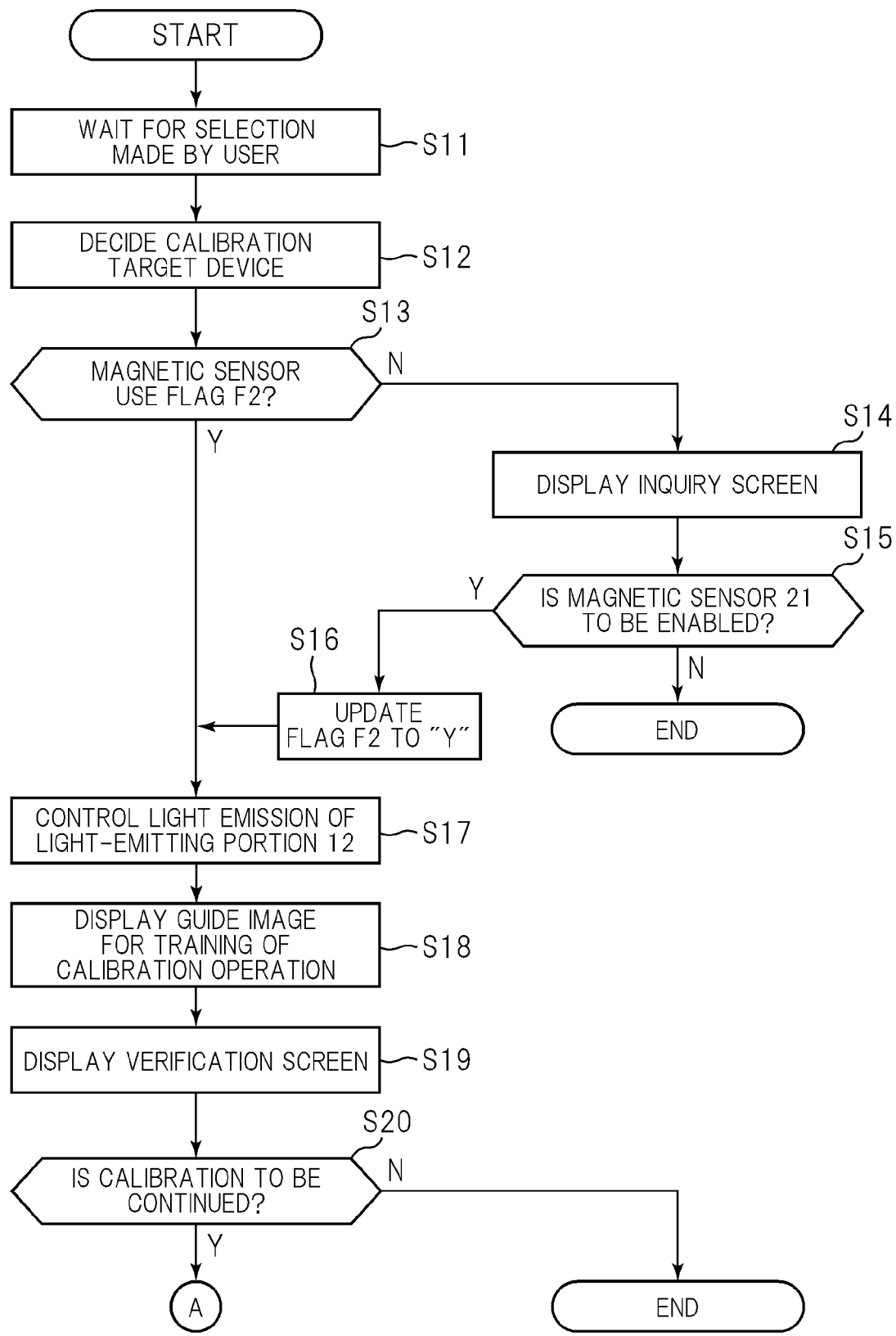

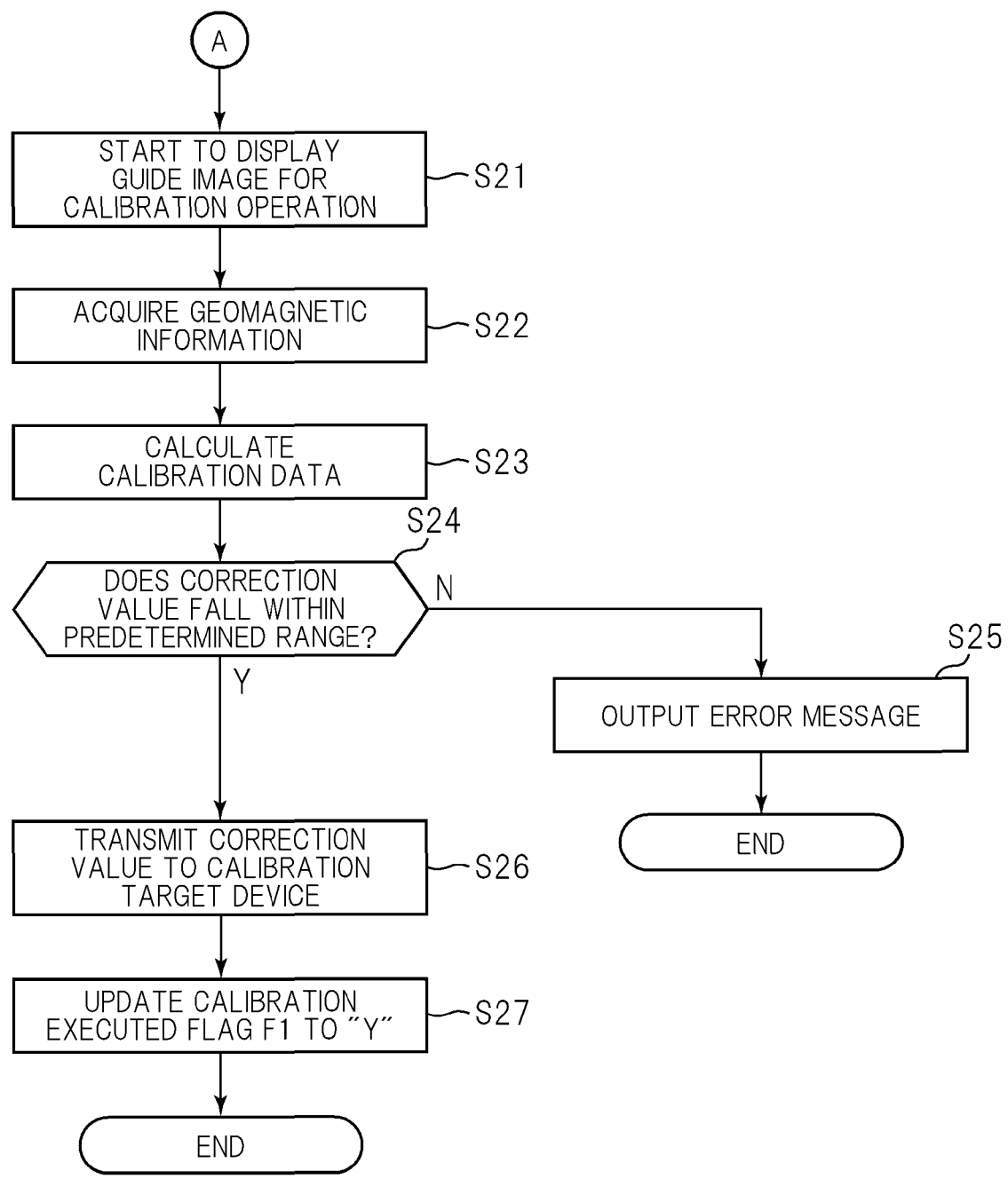

INFORMATION PROCESSING SYSTEM

BACKGROUND OF THE INVENTION

1. Field of the Invention

The present invention relates to a communication device incorporating a sensor, an information processing device that performs calibration processing for the sensor, a control method therefor, an information storage medium that stores a control program therefor, and an information processing system including the communication device and the information processing device.

2. Description of the Related Art

There are known some sensors for which calibration needs to be performed prior to use thereof because output characteristics thereof vary depending on ambient environments and the like. Before use of such a sensor, calibration processing is previously performed, for example, by examining its output characteristics by a method of measuring an output value in a reference state or other such methods and by calculating a correction value corresponding to the output characteristics. After that, when actual measurement is performed by using the sensor, a measurement value closer to the real value can be acquired by using the calculated correction value to correct the output value of the sensor.

Such a sensor is incorporated into various devices. For example, some controllers of consumer game machines incorporate a sensor such as an acceleration sensor in order to detect a posture and a movement of the controller.

In a case where the sensor described above is incorporated into a portable communication device, even if calibration is executed in one place, the correction value obtained by the calibration may fail to function effectively in another place. In such a case, an information processing device communicatively connected to the communication device can no longer trust a measurement result of the sensor output by the communication device.

SUMMARY OF THE INVENTION

The present invention has been made in view of the above-mentioned circumstances, and an object thereof is to provide an information processing device capable of judging whether or not a measurement result of a sensor output by a communication device can be trusted, a control method therefor, a control program therefor, an information processing system including the information processing device, and a communication device connected to the information processing device.

An information processing system according to the present invention includes: a portable communication device; and a information processing device for indoor use that is communicatively connectable to the portable communication device, in which: the portable communication device includes a sensor that measures predetermined information and outputs a measurement result, the sensor having output characteristics varying depending on a place of use; and the information processing device includes: a section for acquiring the measurement result of the sensor from the communicatively-connected portable communication device; a calibration section for executing calibration of the sensor by using the acquired measurement result; an application execution section for executing an application program that uses the measurement result of the sensor; and a determination section for performing determination as to whether or not the calibration section has executed the calibration for the communicatively-connected communication device when the application program is executed.

Further, a information processing device for indoor use according to the present invention, which is communicatively connectable to a portable communication device including a sensor that measures predetermined information and outputs a measurement result, the sensor having output characteristics varying depending on a place of use, includes: a section for acquiring the measurement result of the sensor from the communicatively-connected portable communication device; a calibration section for executing calibration of the sensor by using the acquired measurement result; an application execution section for executing an application program that uses the measurement result of the sensor; and a determination section for performing determination as to whether or not the calibration section has executed the calibration for the communicatively-connected portable communication device when the application program is executed.

Further, a portable communication device according to the present invention, which is communicatively connectable to a information processing device for indoor use, includes: a sensor that measures predetermined information and outputs a measurement result, the sensor having output characteristics varying depending on a place of use; and a section for receiving calibration data from the information processing device and storing the calibration data, the calibration data being generated by the information processing device executing calibration by using the measurement result of the sensor, in which the portable communication device is subjected to determination as to whether or not the calibration data generated by the information processing device is stored in the portable communication device when the information processing device executes an application program that uses the measurement result of the sensor.

Further, a control method for an information processing device according to the present invention is a control method for a information processing device for indoor use, which is communicatively connectable to a portable communication device including a sensor that measures predetermined information and outputs a measurement result, the sensor having output characteristics varying depending on a place of use, including: acquiring the measurement result of the sensor from the communicatively-connected portable communication device; executing calibration of the sensor by using the acquired measurement result; executing an application program that uses the measurement result of the sensor; and performing determination as to whether or not the calibration has been executed for the communicatively-connected portable communication device when the application program is executed.

An information storage medium according to the present invention is a non-transitory computer-readable information storage medium having a program stored therein, the program controlling a information processing device for indoor use, which is communicatively connectable to a portable communication device including a sensor that measures predetermined information and outputs a measurement result, the sensor having output characteristics varying depending on a place of use, to function as: a section for acquiring the measurement result of the sensor from the communicatively-connected portable communication device; a calibration section for executing calibration of the sensor by using the acquired measurement result; an application execution section for executing an application program that uses the measurement result of the sensor; and a determination section for performing determination as to whether or not the calibration section has executed the calibration for the communicatively-connected portable communication device when the application program is executed.

BRIEF DESCRIPTION OF THE DRAWINGS

In the accompanying drawings:

FIG. 4 is a block diagram illustrating an internal configuration of an information processing device;

FIG. 5 is an explanatory diagram showing contents of flag information stored in the information processing device;

FIG. 6 is a functional block diagram illustrating functions of the information processing device;

FIG. 7 is a diagram illustrating an example of a flow of pairing processing; FIG. 8 is a diagram illustrating an example of a flow of calibration processing;

FIG. 9 is a diagram illustrating an example of the flow of the calibration processing;

DETAILED DESCRIPTION OF THE INVENTION

Figure 1:
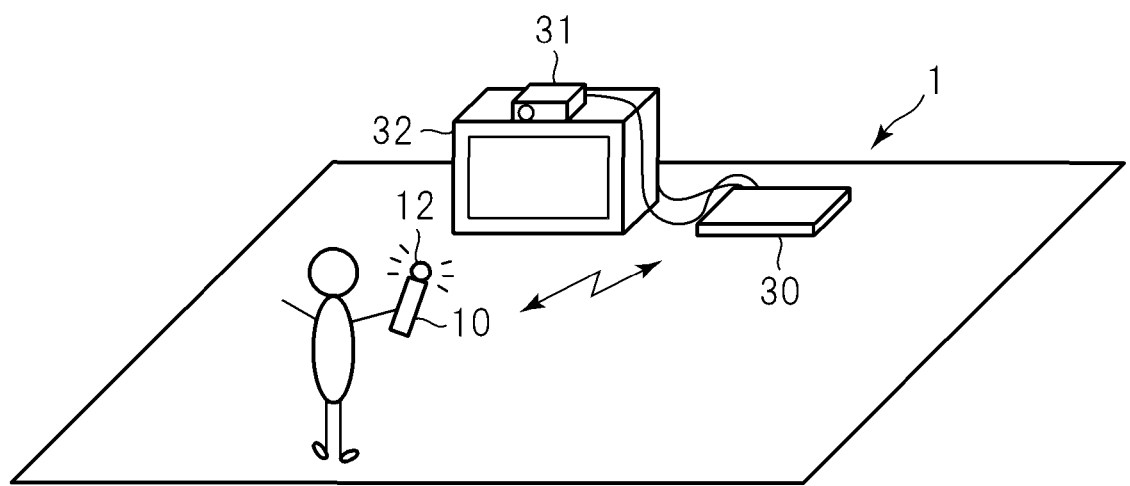
FIG. 1 is a diagram illustrating an overall outline of an information processing system according to an embodiment of the present invention.

An information processing system according to one embodiment of the invention includes: a portable communication device; and a information processing device for indoor use that is communicatively connectable to the portable communication device, in which: the portable communication device includes a sensor that measures predetermined information and outputs a measurement result, the sensor having output characteristics varying depending on a place of use; and the information processing device includes: a section for acquiring the measurement result of the sensor from the communicatively-connected portable communication device; a calibration section for executing calibration of the sensor by using the acquired measurement result; an application execution section for executing an application program that uses the measurement result of the sensor; and a determination section for performing determination as to whether or not the calibration section has executed the calibration for the communicatively-connected communication device when the application program is executed.

In the information processing system, the information processing device may further include a flag information storing section for storing flag information indicating that the information processing device has executed the calibration for the portable communication device in a storage unit when the calibration section executes the calibration, and the determination section may reference the flag information to perform the determination.

Further, in the information processing system, the information processing device may further include a connection destination information acquisition section for acquiring connection destination information necessary to establish a communicative connection to the portable communication device prior to the portable communicative connection to the portable communication device, the flag information storing section may store the flag information indicating that the calibration has not been executed for the portable communication device in the storage unit when the connection destination information acquisition section acquires the connection destination information on the portable communication device, and the connection destination information acquisition section may reacquire the connection destination information on the portable communication device in a case where the information processing device is again to establish a communicative connection to the portable communication device after the portable communication device has been communicatively connected to another information processing device.

Further, in the information processing system, the information processing device maybe communicatively connectable to a plurality of the portable communication devices, and the flag information storing section may store, in association with each of the plurality of portable communication devices that are communicatively connectable to the information processing device, the flag information indicating whether or not the calibration has been executed for each of the plurality of portable communication devices in the storage unit.

Further, in the information processing system, the determination section may perform the determination when the application execution section newly starts execution of the application program.

Further, in the information processing system, the determination section may perform the determination when a communicative connection to the portable communication device starts to be established while the application execution section executes the application program.

Further, in the information processing system, the portable communication device may further include a section for receiving, when the calibration section executes the calibration, device identification information that identifies the information processing device that has executed the calibration from the information processing device and storing the device identification information, and the determination section may use the device identification information stored in the communicatively-connected portable communication device to perform the determination.

Hereinafter, an embodiment of the present invention is described in detail with reference to the accompanying drawings.

FIG. 1 is an overall outline diagram illustrating a scene in which an information processing system 1 according to one embodiment of the present invention is used. As illustrated in FIG. 1, the information processing system 1 includes a portable operation device (communication device) 10 used by being gripped by a user's hand and an information processing device 30. The information processing device 30 is, for example, a consumer game machine or a personal computer, and is connected to an image-taking device 31 and a display device 32.

The operation device 10 is a portable communication device having a size and a weight that allow the user to easily carry the device, and is communicatively connectable to the information processing device 30 via a wireless communication interface such as the Bluetooth (registered trademark) standard. Note that, a plurality of operation devices 10 can be connected to one information processing device 30. The user of the information processing system 1 grips the operation device 10 by the hand, and operates an operation button or the like provided to the operation device 10. In response thereto, contents of the user's operations are transmitted to the information processing device 30 via the wireless communication interface. Further, in this embodiment, the operation device 10 includes a light-emitting portion 12, and the light-emitting portion 12 emits light according to an instruction received from the information processing device 30. The image-taking device 31 takes an image of light emitted from the light-emitting portion 12, and outputs the taken image to the information processing device 30. In addition, the operation device 10 includes a magnetic sensor, and transmits a measurement result obtained by the magnetic sensor to the information processing device 30. The information processing device 30 identifies a posture (position and orientation) of the operation device 10 by using a position and a size of the light-emitting portion 12 within the image taken by the image-taking device 31 and the measurement result of the magnetic sensor incorporated into the operation device 10. This allows the user to perform an operation input to the information processing device 30 by not only operating the operation button or the like provided to the operation device 10 but also moving the operation device 10 itself.

Figure 2:
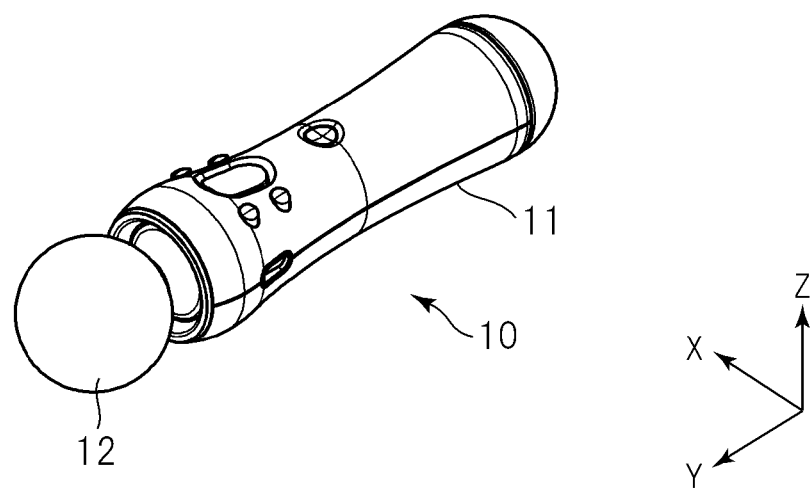
FIG. 2 is a perspective view of an operation device (communication device)

As illustrated in a perspective view of FIG. 2, the operation device 10 includes a main body portion 11 and the light-emitting portion 12, and a plurality of operation buttons to be operated by the user are arranged on a side surface of the main body portion 11. The user grips the main body portion 11 around a center thereof, and performs such an operation input as to depress each of the operation buttons by a finger. Note that, in the following description, a horizontal direction, a vertical direction (longitudinal direction), and a depth direction (thickness direction) of the operation device 10 are expressed as an X-axis, a Y-axis, and a Z-axis, respectively.

The main body portion 11 is formed to have a cylindrical shape as a whole, and has the light-emitting portion 12 attached to one end thereof. The light-emitting portion 12 has a structure including a spherical outer shell made of a material such as a silicone resin that transmits light and a plurality of LEDs located in an inside thereof. In this embodiment, three LEDs corresponding to three primary colors of light each emit light with an intensity according to the instruction received from the information processing device 30, thereby causing the light-emitting portion 12 to emit light of various colors.

Figure 3:
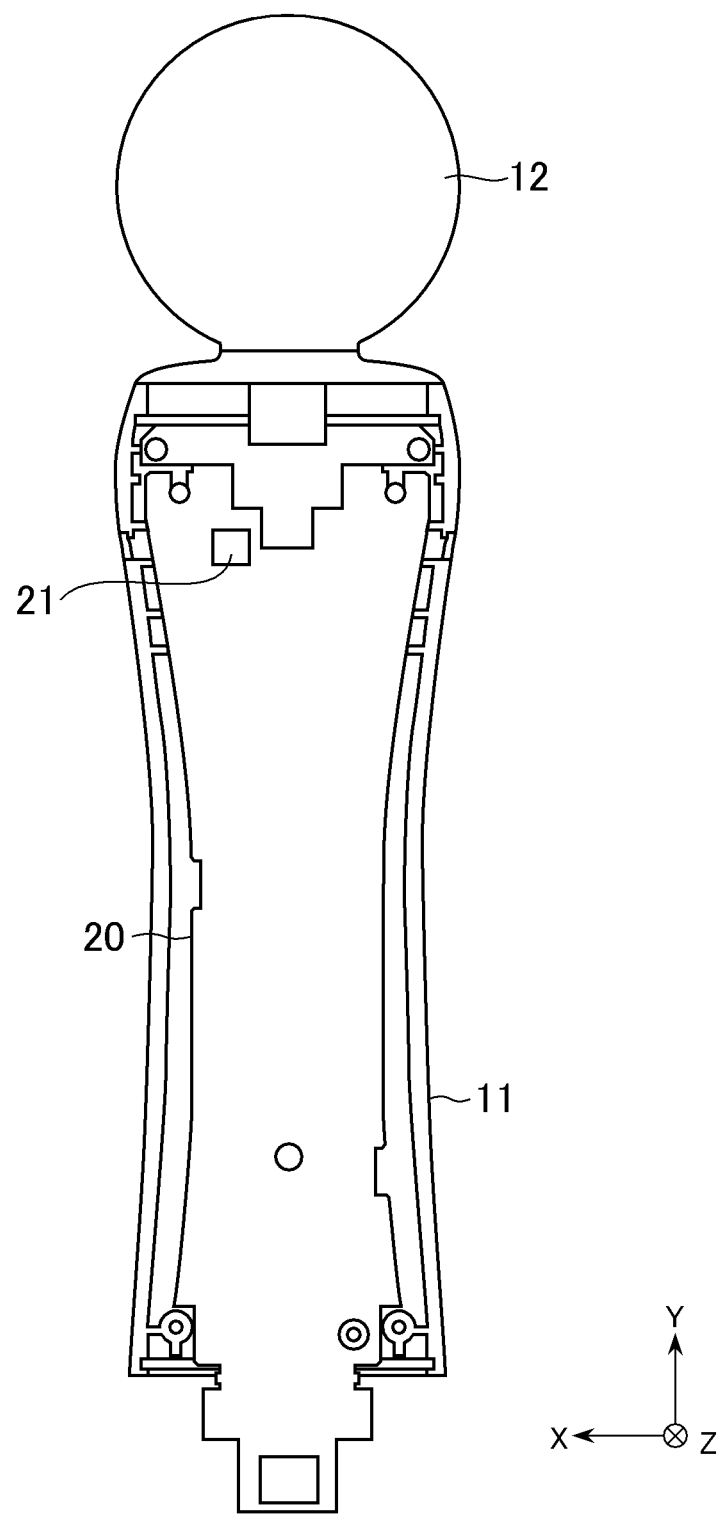
FIG. 3 is a diagram illustrating how a board is located inside the operation device.

Further, a board 20 is located inside the main body portion 11. FIG. 3 is a diagram illustrating how the board 20 is located inside the operation device 10, and illustrating the operation device 10 viewed from a back surface side thereof with a casing of the main body portion 11 partially removed. As illustrated in FIG. 3, the board 20 has a substantially rectangular shape, and is located along a direction parallel with the X-axis and the Y-axis of the operation device 10.

As illustrated in FIG. 3, a magnetic sensor 21 is located on a surface of the board 20 on the back surface side of the operation device 10. In this embodiment, the magnetic sensor 21 is a three-axis magnetic sensor, and measures inclinations of geomagnetism with respect to the respective reference planes which are set to an XY-plane, a YZ-plane, and a ZX-plane of the operation device 10. It is possible to identify a change of the orientation of the operation device 10 by analyzing a change over time of the measurement results of the geomagnetism on the respective planes. As apparent from FIG. 3, the magnetic sensor 21 is located on the board 20 at its end portion on the side close to the light-emitting portion 12.

The measurement result of the magnetic sensor 21 may vary in its output characteristics depending on a magnetic field environment of a place in which the magnetic sensor 21 is used. In other words, the magnetic sensor 21 receives an influence of a magnetic field inherent in the place of use, and the measurement result may deviate from the intrinsic direction of the geomagnetism. Accordingly, for example, even if calibration of the magnetic sensor 21 is performed at the time of factory shipment, it may be desired that the calibration be performed again when the user actually uses the operation device 10 in his/her home or the like. Therefore, in this embodiment, the information processing device 30 that operates according to the operation input with respect to the operation device 10 is configured to execute calibration processing for the magnetic sensor 21 incorporated into the operation device 10.

Note that, the operation device 10 may incorporate various sensors (not shown) for detecting the posture of the operation device 10 and a change thereof such as an acceleration sensor and a gyroscope in addition to the magnetic sensor 21.

Next, a configuration of the information processing device 30 is described. The information processing device 30 is, for example, a consumer game machine or a personal computer, and is a device for indoor use that is used by being set inside the user's home or the like. As illustrated in FIG. 4, the information processing device 30 includes a control unit 33, a storage unit 34, and a communication unit 35, and is connected to the image-taking device 31 and the display device 32.

The control unit 33 is a program control device such as a CPU, and performs various kinds of information processing according to a program stored in the storage unit 34. The processing executed by the control unit 33 in this embodiment is described later.

The storage unit 34 is configured by including a memory device such as a RAM and a ROM and a disk device such as a hard disk drive, and stores the program executed by the control unit 33 and various kinds of data used in the processing executed by the control unit 33. Further, the storage unit 34 also functions as a work memory for the control unit 33. In particular, in this embodiment, information such as the measurement result of the sensor transmitted from the operation device 10 is temporarily stored in the storage unit 34.

Further, the storage unit 34 includes a storage area (for example, a nonvolatile memory) in which data is not erased based on when the information processing device 30 is powered off and which stores information regarding the operation devices 10 connected to the information processing device 30 and various kinds of flag information regarding the use of the magnetic sensors 21 incorporated into those operation devices 10. Specifically, the storage unit 34 stores such kinds of flag information as shown in FIG. 5. Hereinafter, those kinds of information are described.

First, the storage unit 34 of the information processing device 30 stores connection destination information on the operation device 10 that can be connected to the same information processing device 30. As described above, a plurality of operation devices 10 can be connected to the information processing device 30, and hence the storage unit 34 stores the connection destination information for each of the plurality of operation devices 10. Here, the connection destination information is information necessary for the information processing device 30 to identify the operation device 10 of a communication counterpart and establish a communicative connection, and may be, for example, a Bluetooth device address. To use a newly-purchased operation device 10 by connecting the operation device 10 to the information processing device 30, the user first needs to register the connection destination information thereon with the information processing device 30. In the case of a Bluetooth device, processing for exchanging such connection destination information with the communication counterpart and registering the connection destination information on the communication counterpart is referred to as "pairing processing".

In addition, each of connection destination information items on those operation devices 10 that can be connected is stored in association with a calibration executed flag F1 indicating whether or not the calibration of the magnetic sensor 21 incorporated into the corresponding operation device 10 has been executed. As apparent from FIG. 5, the calibration executed flag F1 is independently prepared for each of the plurality of operation devices 10. The calibration executed flag F1 is a flag indicating whether or not the calibration of the magnetic sensor 21 has been executed by the information processing device 30 for the corresponding operation device 10, and when the information processing device 30 executes calibration processing, stores a value indicating that the calibration has been executed (here, set as "Y"). Note that, when the connection destination information on the operation device 10 is first stored in the information processing device 30, the calibration executed flag F1 is initialized to a value indicating that the calibration has not been executed (here, set as "N").

Second, the storage unit 34 of the information processing device 30 stores a magnetic sensor use flag F2 indicating whether or not the magnetic sensor 21 can be used. The magnetic sensor use flag F2 is a flag indicating whether or not the information processing device 30 is to use the magnetic sensor 21 incorporated into the operation device 10 in the processing executed by the same information processing device 30. If the magnetic sensor use flag F2 stores a value indicating that the magnetic sensor 21 is not to be used (here, set as "N"), the information processing device 30 does not use the measurement result of the magnetic sensor 21 in processing of an application execution section 44 described later. On the other hand, if the magnetic sensor use flag F2 stores a value indicating that the magnetic sensor 21 is to be used (here, set as "Y"), the information processing device 30 can use the measurement result of the magnetic sensor 21. Note that, the magnetic sensor use flag F2 is information irrelevant to the individual operation device 10 connected to the information processing device 30. In other words, only one magnetic sensor use flag F2 is prepared as a flag information item for one information processing device 30, and if a value thereof is "N", the measurement result of the magnetic sensor 21 incorporated into any one of the connected operation devices 10 is not used. For example, it may be difficult for the magnetic sensor 21 to measure the geomagnetism depending on the magnetic field environment around a place in which the information processing device 30 is set. In such a case, by performing an instruction operation with respect to the information processing device 30, the user can change the value of the magnetic sensor use flag F2 to "N" to thereby inhibit an application program from using the measurement result of the magnetic sensor 21.

The communication unit 35 is a communication interface having the same standard as that of the communication interface provided to the operation device 10, and executes transmission/reception of information with the operation device 10. In this embodiment, the communication unit 35 is provided with a wireless communication interface based on the Bluetooth standard and a wired communication interface based on the universal serial bus (USB) standard as communication interfaces for establishing a communicative connection to the operation device 10. Note that, the communication unit 35 uses the above-mentioned connection destination information to identify the operation device 10 of the connection destination and perform wireless communications therewith.

Hereinafter, functions implemented by the information processing device 30 in this embodiment are described. As illustrated in FIG. 6, the information processing device 30 functionally includes an operation device management section 41, an operation device information receiving section 42, a calibration processing section 43, the application execution section 44, and a flag information determination section 45. Those functions are implemented by the control unit 33 executing the programs stored in the storage unit 34. Those programs, for example, may be provided to the information processing device 30 via a communication network such as the Internet, or may be provided by being stored in any kind of computer-readable information storage medium such as an optical disc.

The operation device management section 41 manages information regarding the operation device 10 connected to the information processing device 30. Specifically, with regard to the plurality of operation devices 10 that may be connected to the information processing device 30, the operation device management section 41 acquires the connection destination information necessary to establish a communicative connection to those operation devices 10, and stores the connection destination information in the storage unit 34. In particular, when the user attempts to use a new operation device 10 having the connection destination information that has not been stored in the information processing device 30, the operation device management section 41 performs the pairing processing for acquiring the connection destination information on the operation device 10 and providing the connection destination information on itself to the operation device 10.

The operation device information receiving section 42 receives information transmitted by the operation device 10 every predetermined time (for example, every 11.25 ms). Here, the information received from the operation device 10 includes information indicating the contents of the operation performed by the user with respect to the operation buttons provided to the operation device 10. Further included is information indicating the measurement result of the magnetic sensor 21 provided to the operation device 10 (hereinafter, referred to as "geomagnetic information").

The calibration processing section 43 executes the calibration processing for the magnetic sensor 21 by using the geomagnetic information acquired by the operation device information receiving section 42. Here, the calibration processing executed by the calibration processing section 43 is processing for calculating a correction value used to correct an output result of the magnetic sensor 21 incorporated into a calibration target device by assuming that the calibration target device is one specific operation device 10 among the plurality of operation devices 10 connected to the information processing device 30. In particular, in this embodiment, the calibration processing is performed by acquiring the measurement result of the magnetic sensor 21 while the user is changing the posture of the calibration target device. Therefore, the calibration processing section 43 executes the calibration processing while displaying on a screen of the display device 32 a guide image Ig that guides the user on how the posture of the calibration target device is to be changed.

The application execution section 44 executes the processing of an application program for a game or the like. In this embodiment, the application execution section 44 executes processing that uses the geomagnetic information acquired by the operation device information receiving section 42. For example, the application execution section 44 executes processing for moving a character or an object that appears in the game based on the change in the direction of the geomagnetism obtained as a result of the user's moving the operation device 10.

The flag information determination section 45 references the information on the calibration executed flag F1 stored in the storage unit 34 to determine whether or not the calibration processing for the magnetic sensor 21 has been executed with regard to the currently-connected operation device 10. The flag information determination section 45 executes such determination processing based on the flag information before, for example, the application execution section 44 loads the application program and starts the processing of the application program. Alternatively, the flag information determination section 45 may execute the determination processing based on the flag information also when a connection to a new operation device 10 is detected while the application execution section 44 is executing the processing.

Note that, the function implemented by the flag information determination section 45 relates to the processing performed commonly for the application programs that use the measurement result of the magnetic sensor 21 irrespective of the type of application program executed by the application execution section 44. Therefore, the function of the flag information determination section 45 may be implemented by the control unit 33 executing a system program other than the application program in the same manner as the functions of the operation device management section 41 and the calibration processing section 43. Alternatively, the function may be implemented by the control unit 33 executing the application program in the same manner as the function of the application execution section 44.

Hereinafter, the flowchart of FIG. 7 is referenced to describe a specific example of the pairing processing executed by the operation device management section 41. Note that, in this embodiment, the pairing processing is started with the connection established between the information processing device 30 and the operation device 10 via a USB cable as a trigger. However, the present invention is not limited thereto, and, for example, the pairing processing may be executed by wireless communications in the same manner as a general Bluetooth device.

First, the user uses the USB cable to connect the operation device 10 to be paired to the information processing device 30 (S1), and then the operation device 10 detects that the own operation device 10 has been connected to another communication device by wired communications. In response thereto, according to a USB protocol, the operation device 10 transmits information such as a device type of itself to the information processing device 30. The operation device management section 41 receives the above-mentioned information, and determines the type of the USB-connected device (S2).

When determining as a result of the processing of Step S2 that the USB-connected device is the operation device 10 to be paired, the operation device management section 41 exchanges the connection destination information with the operation device 10 (S3). In other words, the operation device management section 41 transmits the connection destination information on the information processing device 30 to the operation device 10, and receives the connection destination information on the operation device 10 from the operation device 10.

The operation device management section 41 uses the connection destination information exchanged in Step S3 to determine whether or not the connected operation device 10 is the operation device 10 that has already been paired (S4). At this time, if the connection destination information on the operation device 10 received in Step S3 is not included in the list of the operation devices 10 that can be connected illustrated in FIG. 5, it is determined that the pairing has not been finished. On the other hand, in this embodiment, even if the connection destination information on the operation device 10 received in Step S3 is included in the list of the operation devices 10 that can be connected, it is not always determined that the pairing has been finished. For example, after the operation device 10 is paired with a first information processing device 30, when the operation device 10 is paired with a second information processing device 30, the connection destination information on the first information processing device 30 is erased from the operation device 10. This is because there is such a restriction that the operation device 10 cannot maintain a state of being paired with a plurality of information processing devices 30 simultaneously. In this case, when the operation device 10 is USB-connected to the first information processing device 30 again, the pairing is again performed between the operation device 10 and the first information processing device 30 even though the first information processing device 30 stores the connection destination information on the operation device 10 in the storage unit 34. In order to allow such control, the operation device management section 41 receives from the USB-connected operation device 10 a determination result as to whether or not the connection destination information on the information processing device 30 transmitted in Step S3 has been stored. Then, only if the connection destination information on the counterpart exchanged in Step S3 has already been stored on both sides of the operation device 10 and the information processing device 30, it is determined that the operation device 10 that is currently connected has been paired.

If it is determined in Step S4 that the operation device 10 that is currently connected has been paired, the operation device management section 41 does not need to again perform the pairing processing, and hence the processing is brought to an end. On the other hand, if it is determined that the pairing has not been finished, the operation device 10 and the information processing device 30 both record the connection destination information on the counterpart exchanged in Step S3 to perform the pairing processing (S5). Note that, at this time, the operation device management section 41 may transmit/receive other information necessary to establish a communicative connection to the operation device 10 to/from the operation device 10 (for example, random number information necessary to generate a decryption key).

In addition, in this embodiment, if the pairing processing is performed with respect to the operation device 10 in Step S5, the operation device management section 41 records the calibration executed flag F1 in association with the operation device 10 (S6). At this time, the value of the calibration executed flag F1 is initialized to "N".

By the above-mentioned processing, when a new operation device 10 is connected to the information processing device 30, the calibration executed flag F1 associated with the new operation device 10 is always prepared, and has the value initialized to "N".

Next described is a specific example of the calibration processing executed by the calibration processing section 43. For example, the user operates the operation button or the like of the operation device 10 to thereby call a system menu screen of the information processing device 30 and select therefrom a menu item indicating the start of execution of the calibration. The calibration processing is thus started. FIGS. 8 and 9 are flowcharts illustrating a flow of the calibration processing executed by the calibration processing section 43.

First, the calibration processing section 43 displays a screen that prompts the user to select the operation device 10 to be subjected to the calibration, and waits until the user selects the operation device 10 (S11). The user selects the operation device 10 for which the user wishes to perform the calibration processing from among the operation devices 10 with which the pairing processing has already been executed and which are now ready to be connected to the information processing device 30, and operates an operation button provided thereto. The information processing device 30 decides the calibration target device by receiving a signal indicating the operation content (S12).

After that, the calibration processing section 43 references the magnetic sensor use flag F2 to determine whether or not the magnetic sensor 21 can be used (S13). If the value of the magnetic sensor use flag F2 is "N", the calibration processing section 43 displays a screen that inquires as to whether or not to enable the magnetic sensor 21 (S14), and receives the selection made by the user (S15). With the inquiry screen displayed, if the user operates the operation button of the calibration target device to select the enabling of the magnetic sensor 21, the calibration processing section 43 updates the value of the magnetic sensor use flag F2 to "Y" (S16), and advances to Step S17 to continue the calibration processing. On the other hand, if the user does not select the enabling of the magnetic sensor 21, the calibration processing section 43 ends the calibration processing.

If it is determined in Step S13 that the magnetic sensor 21 can be used (in other words, if the value of the magnetic sensor use flag F2 is "Y", or if the user selects in Step S15 the enabling of the magnetic sensor 21, in order to notify the user of the start of the calibration processing, the calibration processing section 43 outputs a control signal that causes the light-emitting portion 12 of the calibration target device to emit light of a predetermined color (S17).

After that, the calibration processing section 43 displays on the screen of the display device 32 the guide image Ig that guides the user through an operation (calibration operation) to be performed by the user in the calibration processing (S18). The guide image Ig is an image that notifies the user of how the user is to perform the calibration operation, and is a moving image that changes over time. Note that, in this embodiment, instead of causing the user to execute the calibration operation immediately, the user is first trained in the calibration operation. Therefore, in Step S18, the guide image Ig for the calibration operation is displayed along with an indication of being in a training mode. While watching the guide image Ig, the user actually performs an operation for changing the orientation of the calibration target device (in other words, operation for rotating the calibration target device) to grasp an outline of the calibration operation.

When the display of the guide image Ig is finished, the calibration processing section 43 then displays a verification screen that verifies whether or not to continue the calibration processing (S19), and receives the selection made by the user (S20). With the verification screen displayed, if the user operates the calibration target device to select the end of the processing, the calibration processing section 43 ends the processing. On the other hand, if the user selects the continuation of the processing, the calibration processing section 43 starts the actual calibration processing. Note that, although not illustrated in FIG. 8, according to the selection made by the user, the calibration processing section 43 may return to Step S18 to display the guide image Ig for training again.

If the continuation of the calibration processing is selected in Step S20, the calibration processing section 43 starts to display the guide image Ig that guides the user through the calibration operation (S21), and at the same time, starts to acquire the geomagnetic information transmitted from the calibration target device (S22). Note that, the guide image Ig displayed in Step S21 may be the same moving image as the guide image Ig for training displayed in Step S18 except that the indication of being in a training mode is not displayed. The specific contents of the guide image Ig for the calibration operation are described later.

When the display of the guide image Ig is finished, by using the geomagnetic information received by the operation device information receiving section 42 during the display, the calibration processing section 43 calculates the correction value (calibration data) to be used for the correction of the magnetic sensor 21 (S23). Then, the calibration processing section 43 determines whether or not the calculated correction value falls within a predetermined range (S24). If the correction value does not fall within the predetermined range, it is estimated that the calibration processing could not be correctly executed because, for example, the user did not perform the calibration operation according to the guide image Ig. Therefore, the calibration processing section 43 outputs an error message (S25), and ends the processing. Note that, the processing is ended here, but instead, according to the selection made by the user, the calibration processing section 43 may return to Step S18 or S21 to execute the calibration processing again.

On the other hand, if it is determined in Step S24 that the correction value falls within the predetermined range, the calibration processing section 43 transmits the calculated correction value to the calibration target device (S26). The calibration target device receives the correction value transmitted in Step S26, and writes the correction value to a built-in memory. Then, from then on, the value corrected by using the correction value is output in the case where the measurement result of the magnetic sensor 21 is transmitted to the information processing device 30.

Finally, the calibration processing section 43 updates the value of the calibration executed flag F1 associated with the calibration target device to "Y" (S27), and ends the calibration processing.

As described above, by updating the value of the calibration executed flag F1 when executing the calibration processing, in spite of the fact that the calibration data itself is stored on the operation device 10 side, the information processing device 30 can manage whether or not the calibration processing has been executed for each of the plurality of operation devices 10 that can be connected to the information processing device 30.

In particular, it is assumed in this embodiment that, due to the hardware restrictions or the like, the operation device 10 retains only one set of calibration data calculated by the calibration processing executed by the calibration processing section 43 of the information processing device 30. However, as described above, the output characteristics of the magnetic sensor 21 vary according to not only an individual difference of the magnetic sensor 21 but also the magnetic field environment of the place of use of the operation device 10. Therefore, after the calibration processing for the magnetic sensor 21 is executed by using the first information processing device 30, when the operation device 10 is to be connected to the second information processing device 30 located in a place other than the first information processing device 30, there is a probability that the correction under desirable conditions cannot be performed in the magnetic field environment of the place where the second information processing device 30 is set even if the calibration data stored in the operation device 10 is used. In such a case, the second information processing device 30 references the value of the calibration executed flag F1 stored therein to thereby determine whether or not the calibration data stored in the connected operation device 10 has been generated by the calibration processing executed by the second information processing device 30.

Further, in this example, a consideration is given to a case where the operation device 10 is used by being again paired with the first information processing device 30 after the second information processing device 30 and the operation device 10 are paired. In this case, even if, in the past, the first information processing device 30 executed the calibration processing for the operation device 10 with the result that the first information processing device 30 stored "Y" as the value of the calibration executed flag F1 associated with the operation device 10, as described above, the value of the calibration executed flag F1 associated with the operation device 10 is initialized to "N" when the first information processing device 30 again executes the pairing processing. In other words, even if the first information processing device 30 executed the calibration processing for a given operation device 10 in the past, when there is a probability that the operation device 10 was paired with the second information processing device 30 after that with the result that the calibration processing was again performed at the place where the second information processing device 30 was set, the first information processing device 30 judges that the calibration processing for the given operation device 10 has not been executed yet. This guarantees that the value of the calibration executed flag F1 stored in the first information processing device 30 is set to "N" when there is a probability that the calibration data that was generated in a place other than the place where the first information processing device 30 is set is stored in the operation device 10, and is set to "Y" only when the calibration data stored in the given operation device 10 was surely generated in the calibration processing executed by the first information processing device 30.

Here, FIGS. 10 to 16 are referenced to describe a display example of the guide image Ig for the calibration operation. FIGS. 10 to 16 sequentially illustrate a change over time of the guide image Ig displayed on the screen of the display device 32 while one calibration operation is performed. In this embodiment, the magnetic sensor 21 measures the magnitude of the geomagnetism by using each of the three reference planes (XY-plane, YZ-plane, and ZX-plane) set in the operation device 10 as a reference. Therefore, when the calibration is performed, it is desired that the geomagnetism be measured while the user rotates the calibration target device to thereby change the orientation of the calibration target device sequentially to six directions, that is, upward, downward, leftward, rightward, frontward, and backward. In addition, it is desired that such an operation for rotating the calibration target device be performed while maintaining the position of the magnetic sensor 21 in an actual space as much as possible.

Here, if the user is only instructed to perform the operation for rotating the calibration target device, the user is likely to rotate the calibration target device about a portion by which the user is gripping the calibration target device. However, as illustrated in FIG. 3, the magnetic sensor 21 is located in a position closer to the light-emitting portion 12 than a center position of the main body portion 11 in a longitudinal direction. Therefore, if the user grips the main body portion 11 around the center thereof and rotate the calibration target device about the portion as its rotation center, the magnetic sensor 21 changes its position within the actual space relatively greatly.

Therefore, in this embodiment, the guide image Ig is displayed for the user so as to cause the user to rotate the calibration target device about the light-emitting portion 12 as a rotation center. This allows the user to reduce a change amount in the position of the magnetic sensor 21 to a lower level than in the case where the calibration target device is rotated about the center position of the main body portion 11 as the rotation center. Note that, it is hard to externally recognize the position in which the magnetic sensor 21 is located, and hence the light-emitting portion 12, which is relatively close to the position in which the magnetic sensor 21 is located and is a member having a characteristic shape and easy to be held by the user, is set as the rotation center, thereby allowing the user to easily perform the calibration operation according to the guide image Ig.

Figure 10:
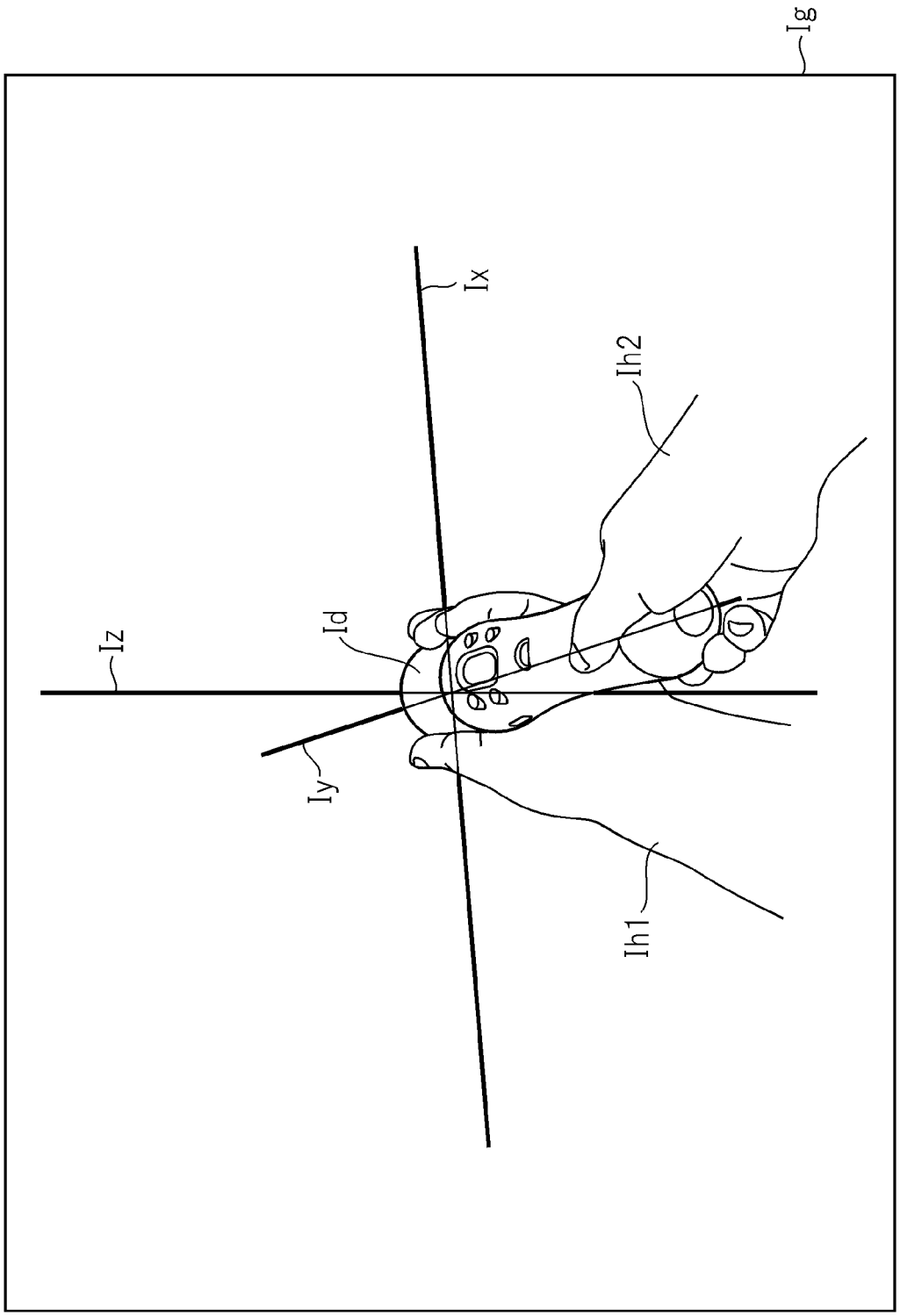
FIG. 10 is a diagram illustrating an example of a guide image for a calibration operation.

Specifically, first, as illustrated in FIG. 10, the calibration processing section 43 displays on the screen of the display device 32 the guide image Ig that shows how the user holds the calibration target device with a predetermined orientation. Note that, in addition to a device image Id that indicates the calibration target device, the guide image Ig of FIG. 10 includes a left hand image Ih1 and a right hand image Ih2 that indicate the left hand and the right hand, respectively, of the user holding the calibration target device.

In addition, in FIG. 10, the calibration processing section 43 displays reference axis images Ix, Iy, and Iz indicating reference axes virtually arranged in the actual space by being included in the guide image Ig. Here, the reference axis images Ix, Iy, and Iz are used to indicate the direction toward which the user is to rotate the calibration target device and also indicate which position of the calibration target device is set as the rotation center to rotate the calibration target device according to a relative positional relationship with the device image Id. Specifically, the reference axis images Ix, Iy, and Iz represent an x-axis, a y-axis, and a z-axis, respectively, which are perpendicular to one another, the x-axis and the y-axis indicating reference axes being set within a horizontal plane, the z-axis indicating a reference axis being set along a vertical direction. Further, the x-axis is set to have the positive direction extending rightward from the left when viewed from the user, the y-axis is set to have the positive direction extending from the front side toward the depth side (display device 32 side) when viewed from the user, and the z-axis is set to have the positive direction extending vertically upward from the lower side. The guide image Ig of FIG. 10 shows a state in which the calibration target device is located along the negative y-axis direction from the origin point position at which the three reference axis images Ix, Iy, and Iz intersect.

Figure 11:
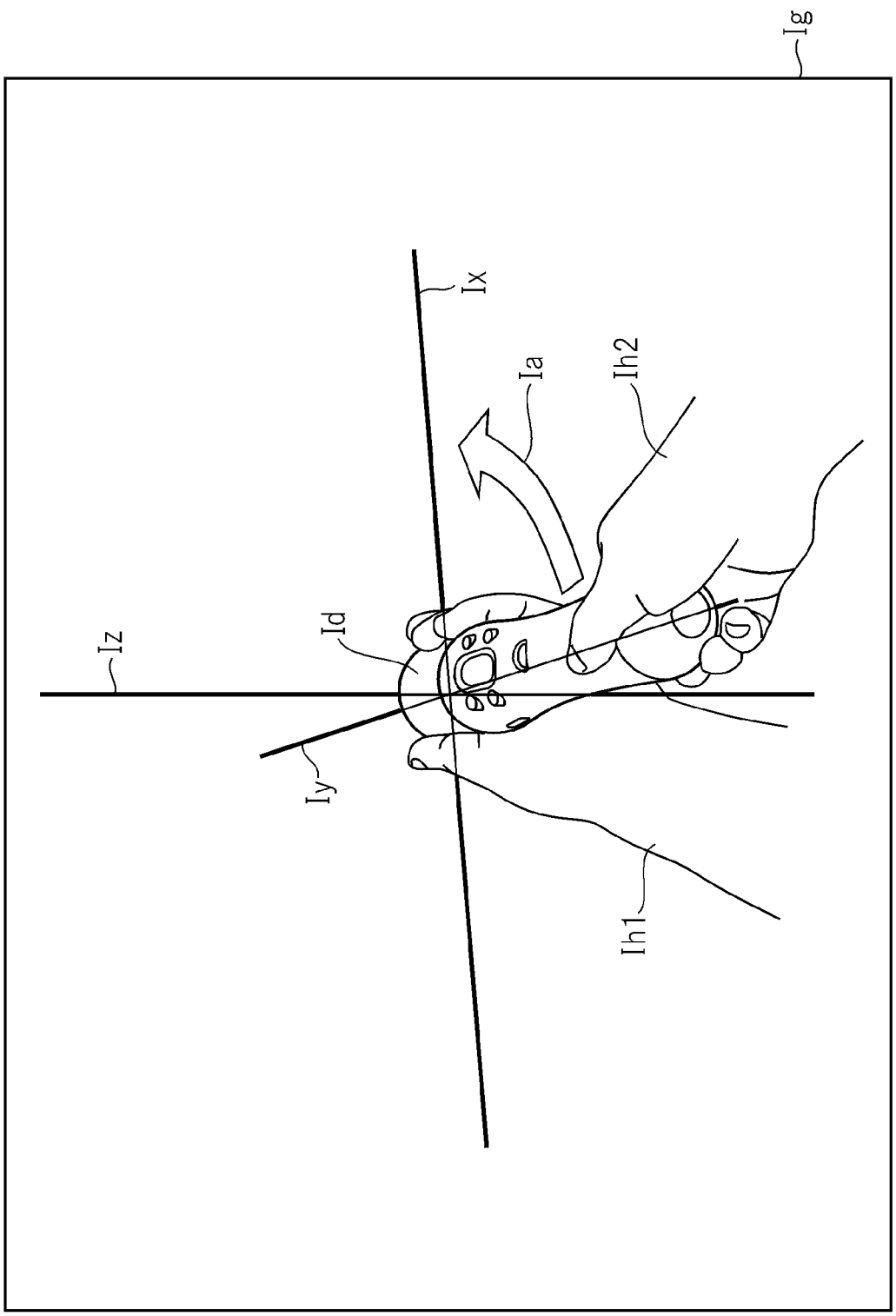
FIG. 11 is a diagram illustrating the example of the guide image for the calibration operation.

After that, as illustrated in FIGS. 11 to 16, the calibration processing section 43 sequentially displays the guide image Ig that prompts the user to perform the operation for rotating the calibration target device. In other words, first, as illustrated in FIG. 11, the calibration processing section 43 displays the guide image Ig obtained by adding an arrow image Ia to the guide image Ig in an initial state illustrated in FIG. 10, the arrow image Ia indicating a rotational direction in which the calibration target device is to be rotated. Illustrated in FIG. 11 is the arrow image Ia that instructs the user to perform the operation for rotating the calibration target device counterclockwise about the z-axis as the rotation center within the horizontal plane.

Figure 12:
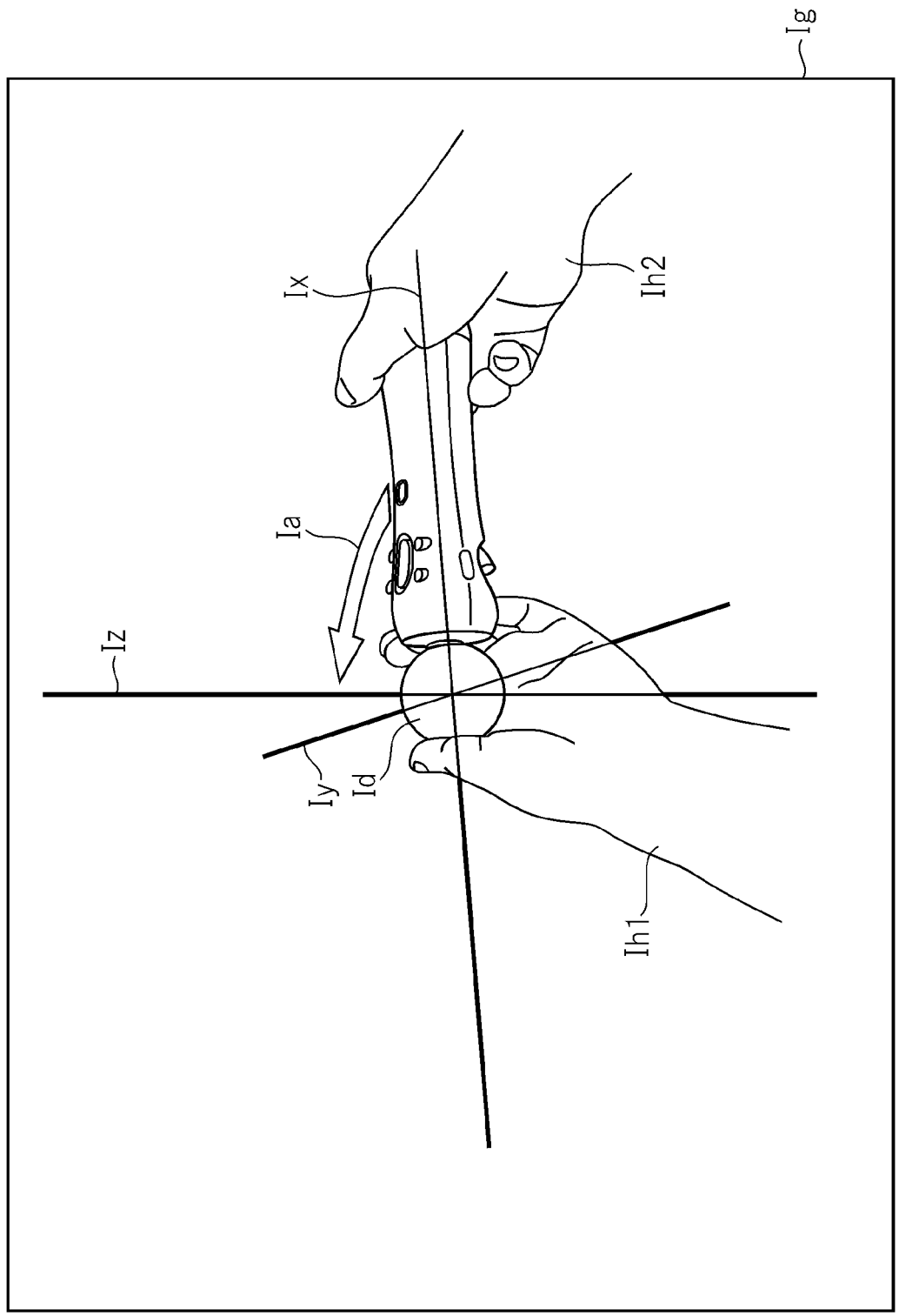
FIG. 12 is a diagram illustrating the example of the guide image for the calibration operation.
Figure 13:
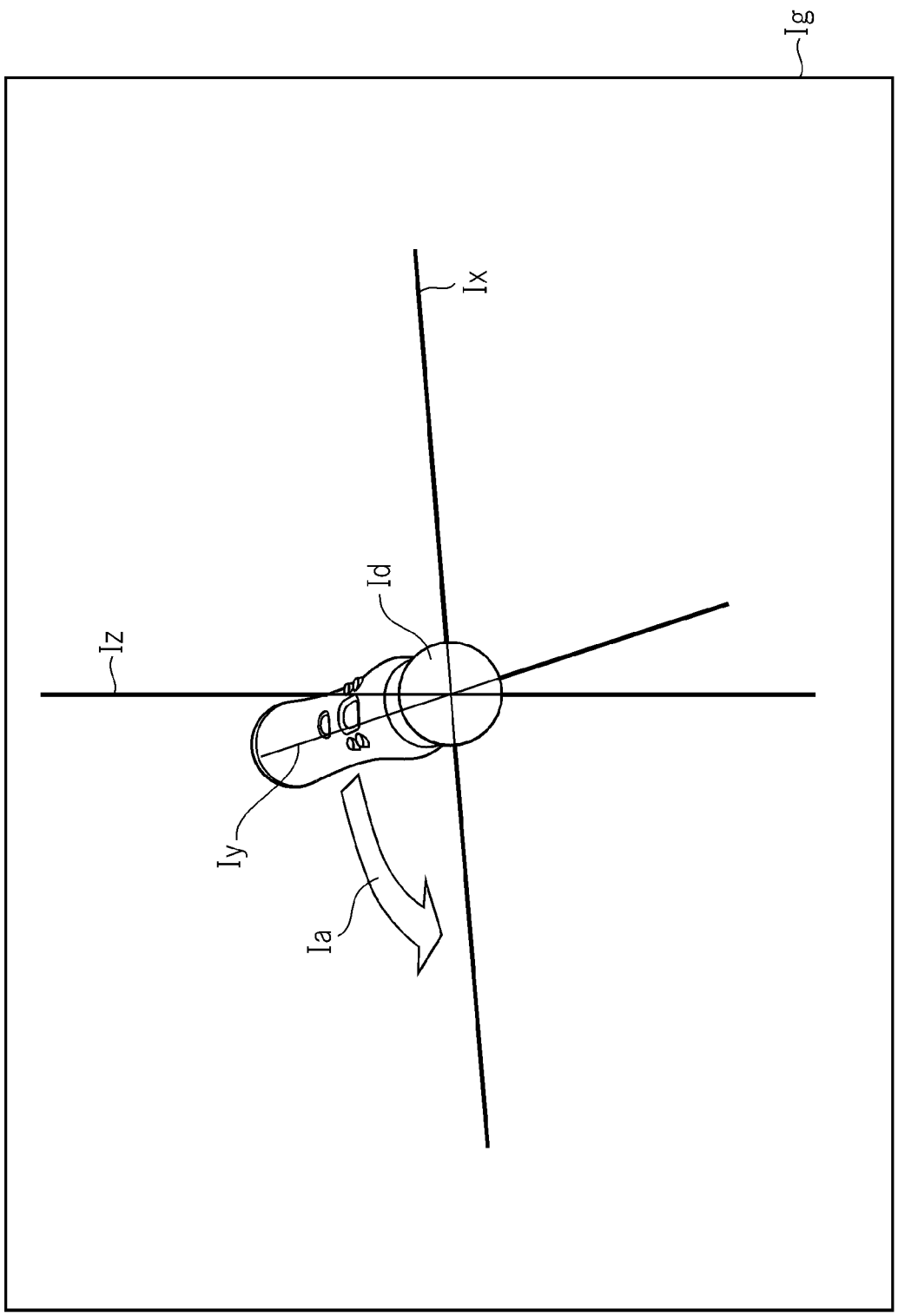
FIG. 13 is a diagram illustrating the example of the guide image for the calibration operation.

Subsequently, the guide image Ig that guides the user through the operation for continuously rotating the calibration target device about the z-axis as the rotation center is sequentially displayed. In other words, after the guide image Ig of FIG. 11 is displayed, the device image Id that shows a state in which the calibration target device has moved to a position along the positive x-axis direction is displayed, and after that, the arrow image Ia that instructs the user to further perform the operation for continuously rotating the calibration target device (arrow image Ia indicating a rotation from the positive X-axis direction toward the positive Y-axis direction) is displayed. FIG. 12 illustrates the guide image Ig including the device image Id and the arrow image Ia as described above. After that, as illustrated in FIG. 13, the guide image Ig that shows a state in which the calibration target device is located along the positive y-axis direction is displayed, and then the guide image Ig that shows a state in which the calibration target device is located along the negative x-axis direction is displayed.

Figure 14:
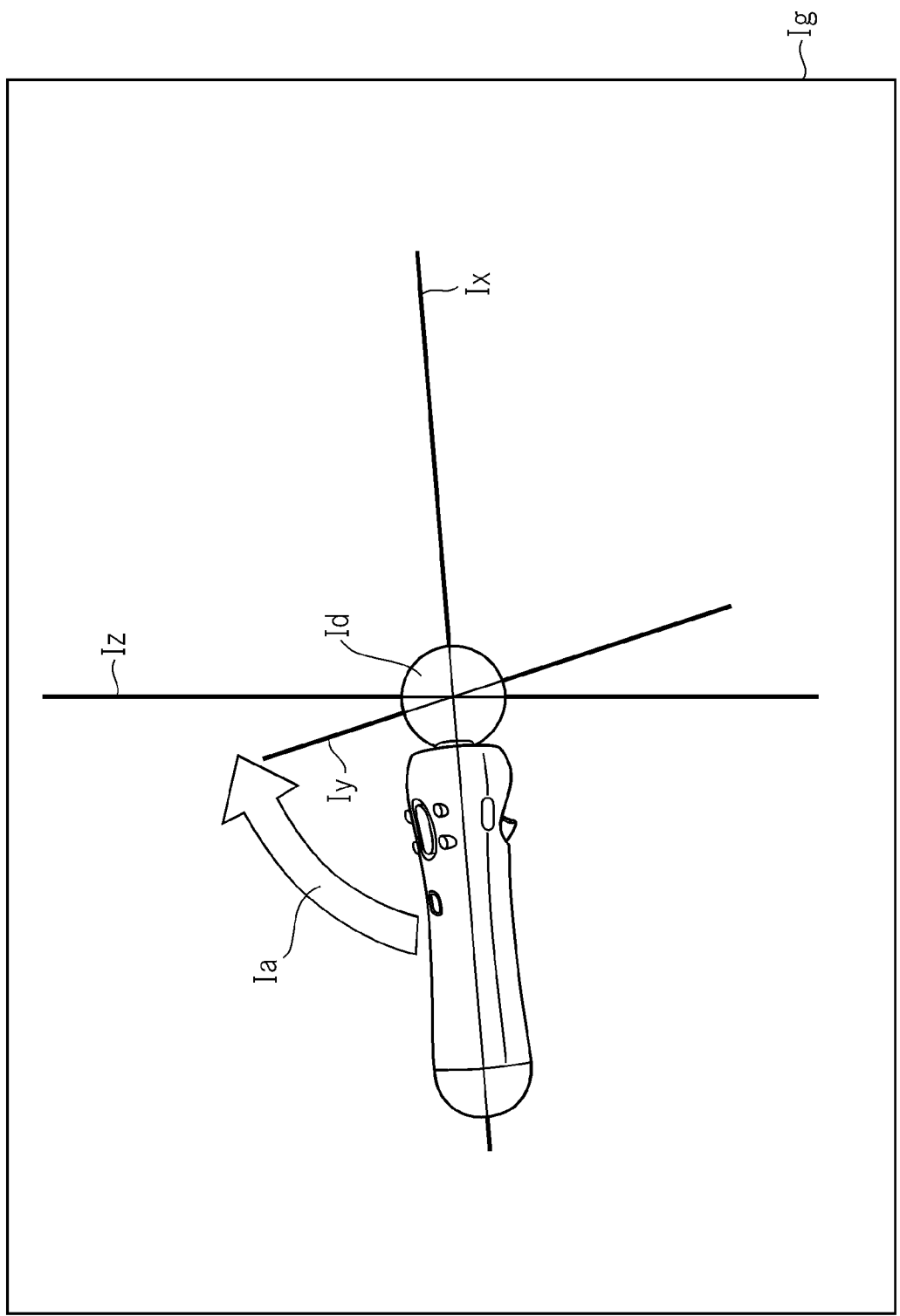
FIG. 14 is a diagram illustrating the example of the guide image for the calibration operation.
Figure 15:
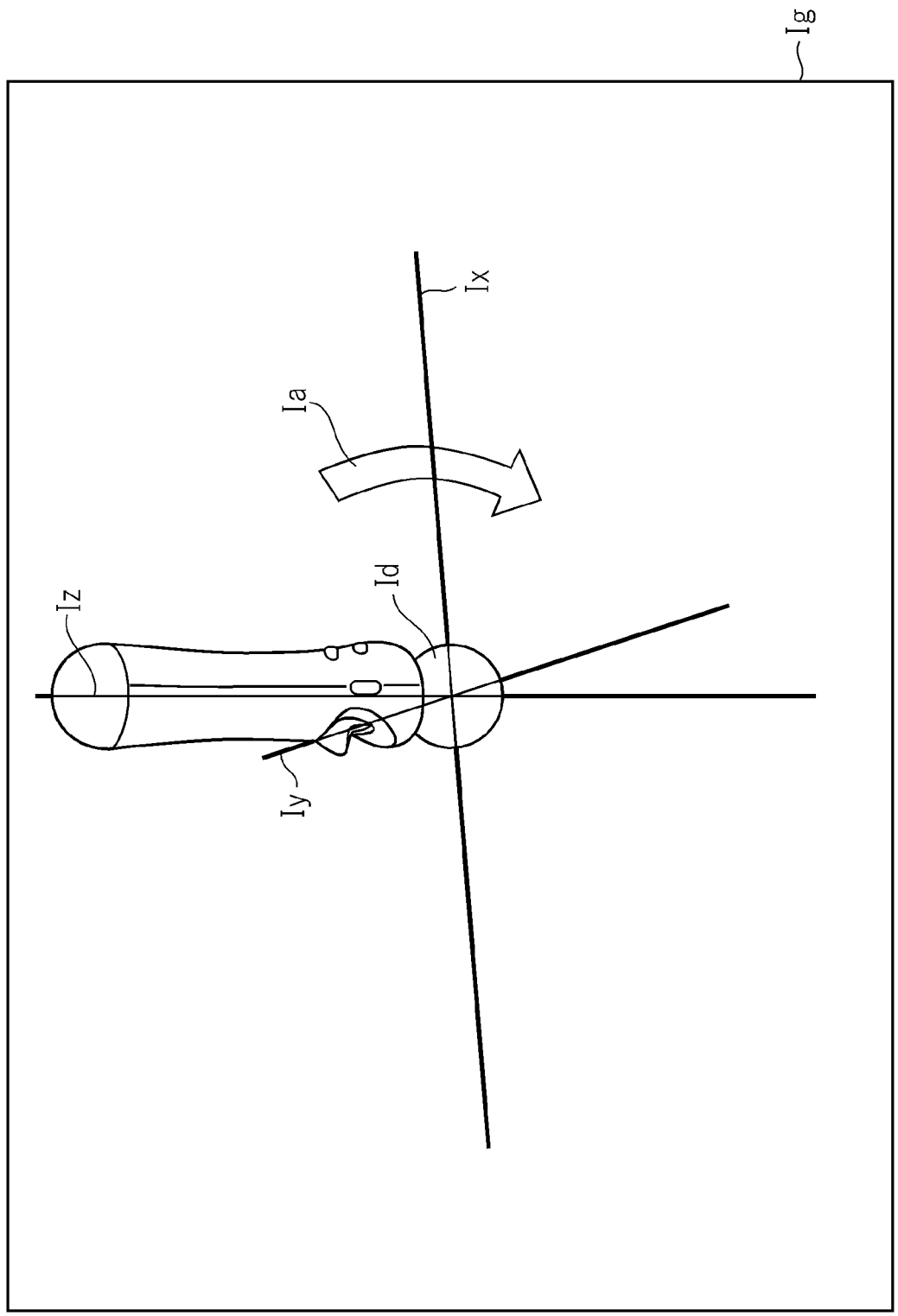
FIG. 15 is a diagram illustrating the example of the guide image for the calibration operation.
Figure 16:
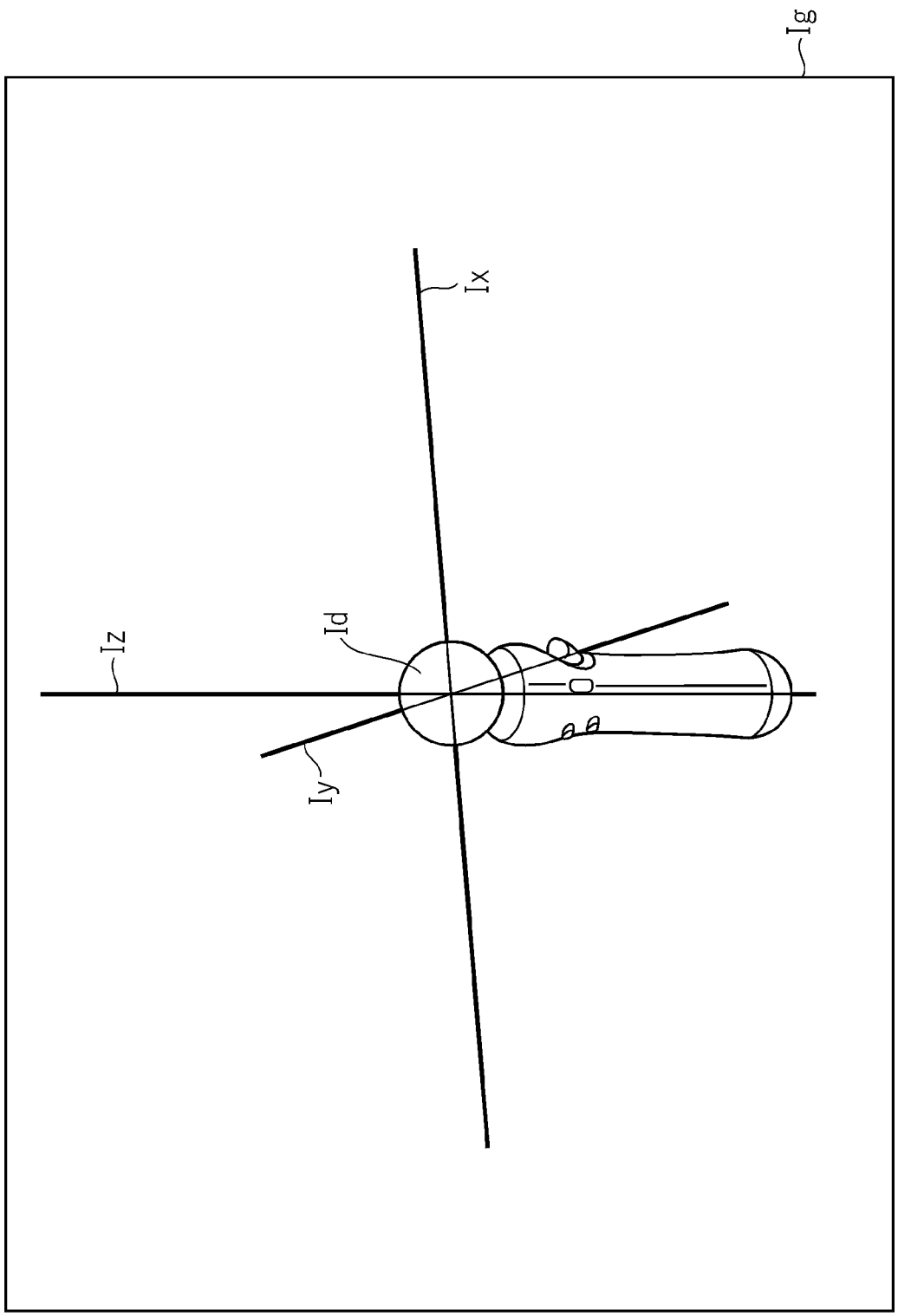
FIG. 16 is a diagram illustrating the example of the guide image for the calibration operation.

In this state, the calibration processing section 43 then presents the user with the guide image Ig that instructs the user to perform a rotational operation with the y-axis used as the rotation center. In other words, as illustrated in FIG. 14, the arrow image Ia that instructs the user to change the orientation of the calibration target device toward the positive z-axis direction is displayed. After that, a state in which the calibration target device is located along the positive z-axis direction is displayed, and in addition, as illustrated in FIG. 15, the arrow image Ia that instructs the user to change the orientation of the calibration target device toward the negative z-axis direction is displayed. Finally, as illustrated in FIG. 16, the guide image Ig that shows a state in which the calibration target device is located along the negative z-axis direction is displayed. By the user performing the operation for rotating the calibration target device according to the above-mentioned guide image Ig, the calibration target device is caused to change its posture so that its lower end (end portion on the opposite side to the light-emitting portion 12) is directed toward the six directions of the negative y-axis direction, the positive x-axis direction, the positive y-axis direction, the negative x-axis direction, the positive z-axis direction, and the negative z-axis direction in the stated order. By acquiring the measurement results of the magnetic sensor 21 collected during the operation, the calibration processing section 43 calculates the calibration data.

Here, as illustrated in FIGS. 10 to 16, the guide image Ig displayed while the user performs the calibration operation is an image that shows a state in which the position of the light-emitting portion 12 always coincides with the origin point position in which all of the x-axis, the y-axis, and the z-axis intersect. In other words, within the guide image Ig, the portion of the calibration target device which is to be set as the rotation center when the user performs the calibration operation is located on the rotation axis. Further, the reference axis images Ix, Iy, and Iz do not change their positions within a screen S while the guide image Ig is displayed. Therefore, the user intuitively understands that the operation for rotating the calibration target device is to be performed while maintaining the position of the light-emitting portion 12 on the actual space. Further, as illustrated in FIGS. 10 and 11, with the displayed guide image Ig showing how to grip the calibration target device so as to be gripped by one hand in the position of the light-emitting portion 12 and gripped by the other hand in the end portion on the opposite side thereto, the user naturally holds the calibration target device by the hand in the position of the light-emitting portion 12 and performs the rotational operation with the position as the center.

Note that, in the above-mentioned example, the left hand image Ih1 and the right hand image Ih2 are omitted from FIGS. 13 to 16 for clarity of the image. However, by displaying the guide image Ig displayed at the start of the calibration operation (here, guide image Ig of FIGS. 10 to 12) by including the left hand image Ih1 and the right hand image Ih2, the user can be caused to naturally grip the light-emitting portion 12 and can thereafter be prompted to perform the calibration operation while holding the calibration target device in the same position. Note that, the left hand image Ih1 and the right hand image Ih2 may be displayed at all times while the guide image Ig is displayed.

Further, in the above description, the device image Id is always displayed in the state of being located along anyone of the reference axes within the guide image Ig and the state of being rotated is displayed by the arrow image Ia. However, the present invention is not limited thereto, for example, the calibration processing section 43 may display a moving image as the guide image Ig, the moving image indicating a process in which the calibration target device gradually moves from a given reference axis toward the next reference axis. Further, within the guide image Ig, a display color of the light-emitting portion 12 may be set as the same color as the color of the light actually emitted from the light-emitting portion 12 of the calibration target device in the above-mentioned processing of Step S17.

Figure 17:
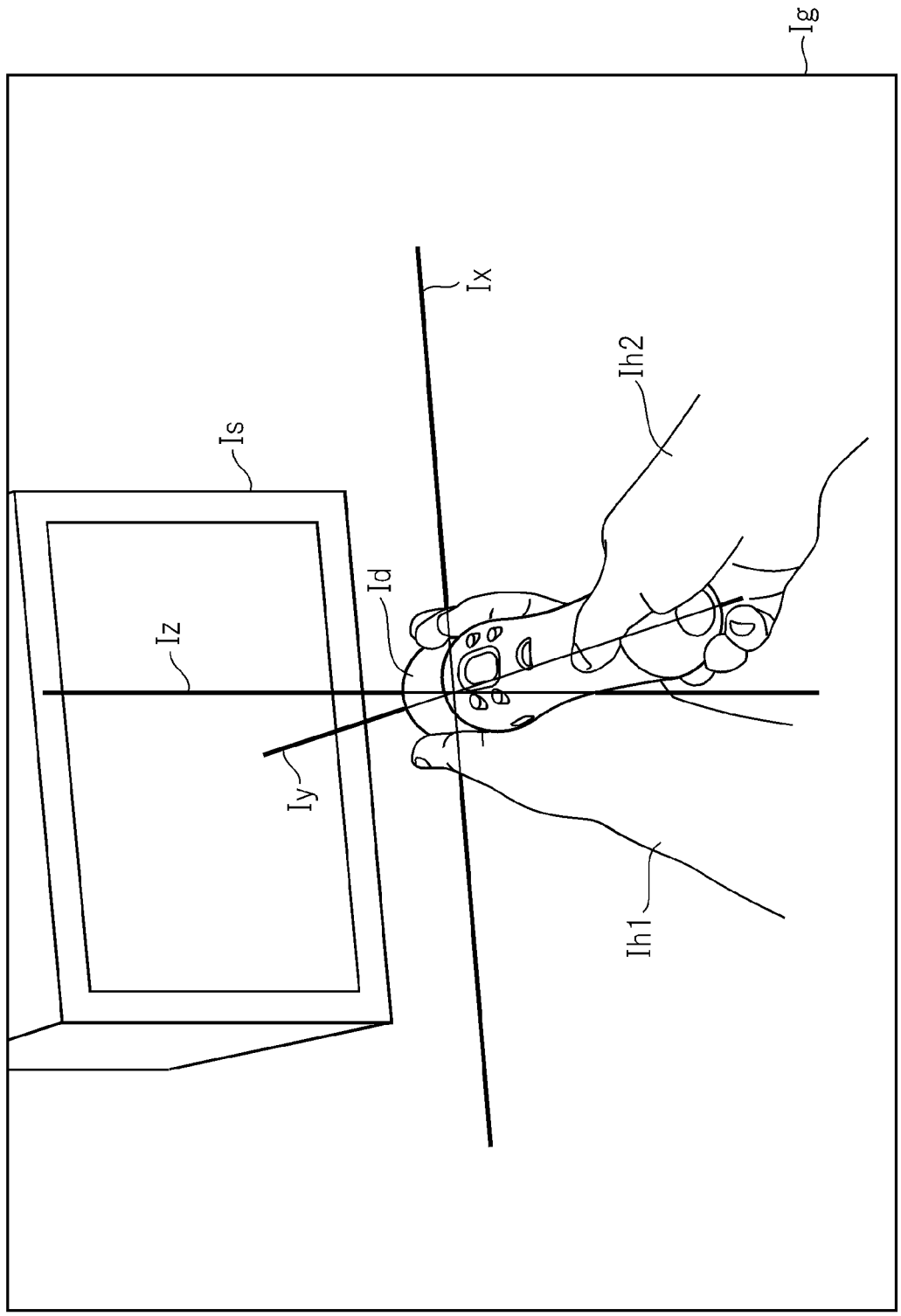
FIG. 17 is a diagram illustrating another example of the guide image for the calibration operation.

Further, the guide image Ig may include a screen image Is that indicates the position of the screen of the display device 32 displaying the guide image Ig. FIG. 17 is a diagram illustrating an example of such a guide image Ig, indicating a state in which the screen image Is is added to the guide image Ig of FIG. 10. The guide image Ig as described above clarifies that the x-axis and the y-axis are set in the horizontal plane with the z-axis set along the vertical direction, and allows the user to intuitively understand which direction to rotate the calibration target device toward.

Figure 18:
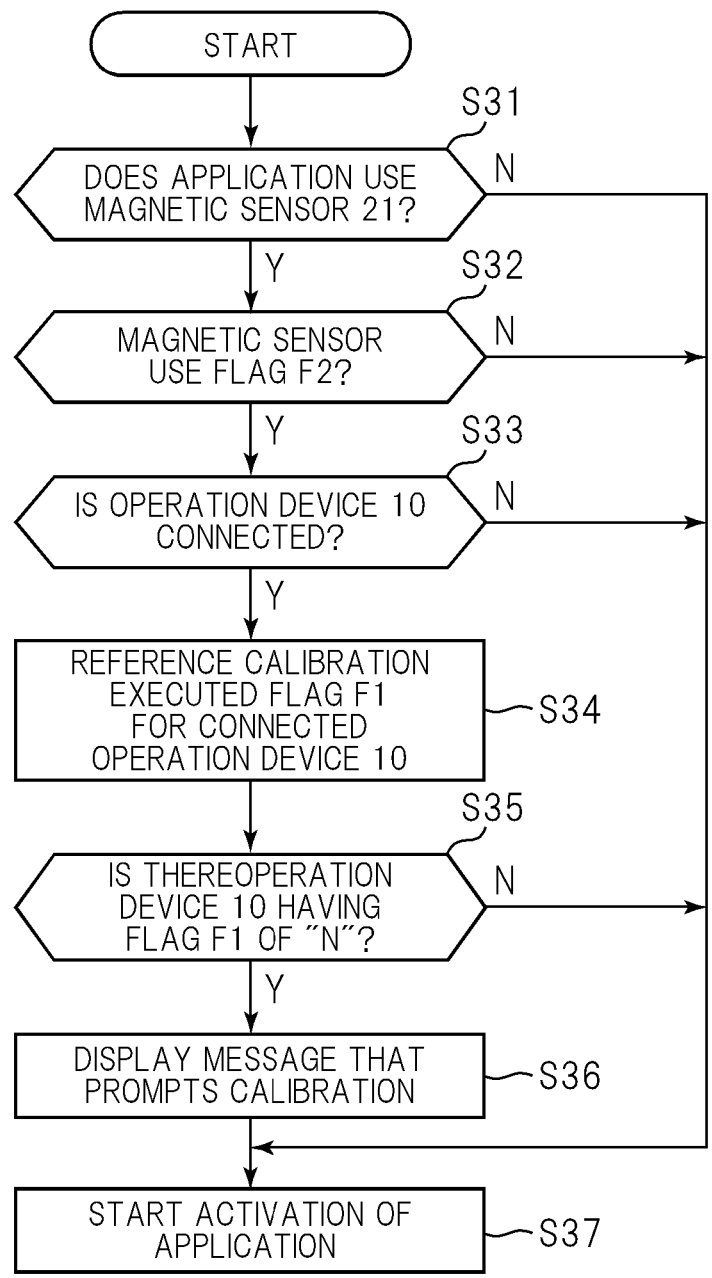
FIG. 18 is a diagram illustrating an example of a flow of processing executed when an application program is activated.

Next described is a specific example of the determination processing based on the flag information which is executed by the flag information determination section 45. First, the flowchart of FIG. 18 is referenced to describe a first example of the flow of the processing executed before execution of a new application program by the flag information determination section 45 when the application execution section 44 starts the execution of the new application program according to the user's instruction.

First, the flag information determination section 45 determines whether or not the application program to be started by the application execution section 44 is an application program of a kind that can use the measurement result of the magnetic sensor 21 (S31). The flag information determination section 45 performs the above-mentioned determination by, for example, referencing the flag information stored in the application program. If the determination results in the application program of a type that does not use the magnetic sensor 21, the flag information determination section 45 does not execute the subsequent processing, and the application execution section 44 starts the activation of the application program (S37).

On the other hand, if the application program of a type that uses the magnetic sensor 21 is determined in Step S31, the flag information determination section 45 then references the magnetic sensor use flag F2 to determine whether or not the magnetic sensor 21 can be used (S32). If the value of the magnetic sensor use flag F2 is "N", which indicates such a setting that the information processing device 30 does not use the function of the magnetic sensor 21, the flag information determination section 45 ends the processing, and the application execution section 44 starts the activation of the application program (S37). In this case, without using the geomagnetic information received by the operation device information receiving section 42, the application execution section 44 executes the processing of the application program by using, for example, information obtained when the image-taking device 31 takes an image of the light-emitting portion 12.

If it is determined in Step S32 that the value of the magnetic sensor use flag F2 is "Y", the flag information determination section 45 subsequently determines whether or not the operation device 10 incorporating the magnetic sensor 21 is connected to the information processing device 30 (S33). If the result of the determination indicates that the operation device 10 incorporating the magnetic sensor 21 is not connected to the information processing device 30 and is only connected to another kind of operation device, the flag information determination section 45 ends the processing, and the application execution section 44 starts the activation of the application program (S37).

On the other hand, if one or a plurality of operation devices 10 incorporating the magnetic sensor 21 is currently connected to the information processing device 30, the flag information determination section 45 references the calibration executed flag F1 for each of those operation devices 10 (S34). Then, it is determined whether or not there is at least one operation device 10 that is currently connected and has the value of the calibration executed flag F1 of "N" associated therewith (S35). If there exists such an operation device 10, the flag information determination section 45 displays a message that prompts the user to execute the calibration processing on the screen of the display device 32 (S36). At this time, if a plurality of operation devices 10 are connected, information indicating which of the operation devices 10 has not been subjected to the execution of the calibration processing (for example, a number assigned to the operation device 10 whose calibration is unexecuted) maybe displayed together. Further, for example, such control as to cause the light-emitting portion 12 of the operation device 10 whose calibration is unexecuted to emit the light of a predetermined color may be executed.

After the display is performed in Step S36, or if it is determined in Step S35 that there exists no operation device 10 whose calibration is unexecuted, the application execution section 44 starts the activation of the application program (S37). Note that, in the example of this flow, even if it is determined that the operation device 10 whose calibration is unexecuted exists, a message to that effect is merely output to the user, and the application program is executed as it is. However, if the operation device 10 whose calibration is unexecuted exists, for example, the calibration processing may be forced to start by the calibration processing section 43. Alternatively, a screen that prompts the user to make a selection as to whether or not to execute the calibration processing may be presented to the user, and the calibration processing may be started before the activation of the application program according to the user's selection.

Figure 19:
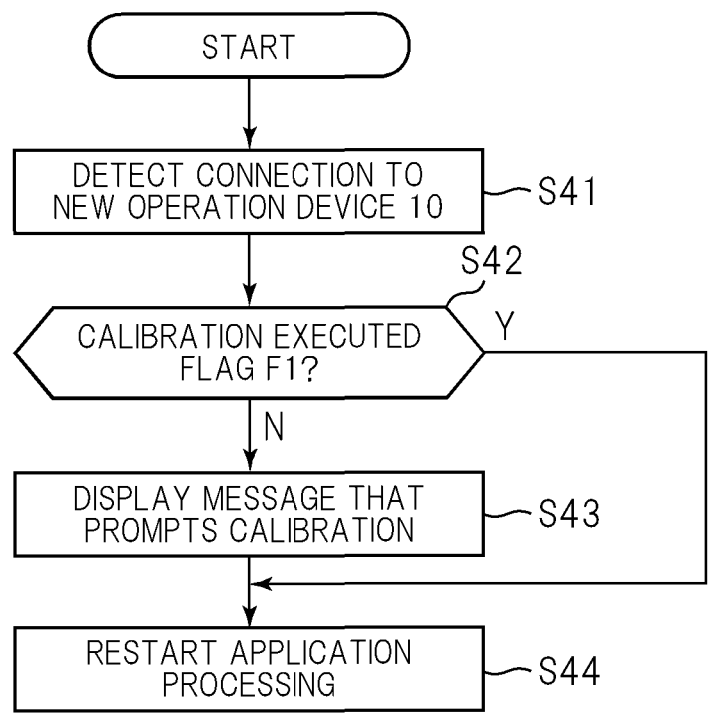
FIG. 19 is a diagram illustrating an example of a flow of processing executed when the operation device is connected during execution of an application program.

Next, the flowchart of FIG. 19 is referenced to describe a second example of the flow of the determination processing based on the flag information which is executed by the flag information determination section 45 in a case where a new operation device 10 that has not been connected so far is connected while the application execution section 44 executes the application program. Note that, the determination processing of the second example is executed only during the execution of the application program that uses the measurement result of the magnetic sensor 21.

First, when the user turns on a power button of an operation device 10 that has been paired with the information processing device 30 or in other such occasions, the flag information determination section 45 detects the connection to the new operation device 10 (S41). Then, the flag information determination section 45 references the calibration executed flag F1 associated with the connected operation device 10 (S42). If the value of the calibration executed flag F1 is "Y", the flag information determination section 45 ends the processing. This restarts the processing of the application execution section 44 (S44).

On the other hand, if the value of the calibration executed flag F1 is "N", in the same manner as the above-mentioned processing of Step S36 in the flow of FIG. 18, the flag information determination section 45 displays the message that prompts the user to execute the calibration processing for the newly-connected operation device 10 on the screen of the display device 32 (S43). After that, the processing of the application execution section 44 is restarted (S44).

As described above, when the execution of the application program is started, when the new operation device 10 is connected, or in other such occasions, by performing the determination with reference to the calibration executed flag F1 before the execution of the processing of the application program that uses the measurement result of the magnetic sensor 21, if there is a probability that the calibration data generated by the information processing device 30 itself is not stored in each of the operation devices 10 connected to the information processing device 30 itself, the information processing device 30 can notify the user to that effect or perform other such operations to thereby prompt the user to execute the calibration processing.

Note that, the embodiment of the present invention is not limited to the above-mentioned embodiment. For example, the contents of the guide image Ig displayed when the calibration processing is executed may be contents that instruct the user to perform the operation for rotating the operation device 10 in another sequence and another direction different from the above-mentioned sequence and direction.

Further, in this embodiment, the sensor to subjected to the calibration processing by the information processing device 30 is not limited to the magnetic sensor, and may be any kind of sensor such as, for example, an acceleration sensor.

Further, the information corresponding to the calibration executed flag F1 may be stored on the operation device 10. In this case, when the calibration processing is executed, the operation device 10 receives a device identification information that identifies the information processing device 30 that has executed the calibration processing (for example, the connection destination information on the information processing device 30) along with the calibration data generated by the information processing device 30, and stores within the built-in memory. Further, in the above-mentioned determination processing based on the flag information, instead of referencing the information on the calibration executed flag F1, the information processing device 30 acquires the device identification information stored in the operation device 10 of the determination target from the operation device 10. Then, the acquired device identification information is used to determine whether or not the calibration has been executed. Specifically, the information processing device 30 determines whether or not the device identification information received from the operation device 10 indicates the information processing device 30 itself, and if the device identification information on the information processing device 30 itself is stored in the operation device 10, judges that the calibration data stored in the operation device 10 may be used in the same manner as in the case where the value of the calibration executed flag F1 is "Y". In contrast, if the acquired device identification information does not indicate the information processing device 30 itself, or if the operation device 10 does not store the device identification information from the beginning, the information processing device 30 outputs the message that prompts the user to execute the calibration processing in the same manner as in the case where the value of the calibration executed flag F1 is "N".

Note that, in this example, the operation device 10 may store a plurality of calibration data items. In this case, the device identification information on the information processing device 30 that has generated each of the plurality of calibration data items is stored in association with the each of the plurality of calibration data items. Then, when connected to any one of the information processing devices 30, the operation device 10 acquires the device identification information on the information processing device 30, uses the calibration data associated with the device identification information to correct the measurement result of the magnetic sensor 21, and then transmits the resultant to the information processing device 30.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing system, comprising:
   a plurality of portable communication devices; and
   an information processing device for indoor use that is communicatively connectable to the plurality of portable communication devices, wherein:
   each of the plurality of portable communication devices comprises a sensor that measures an orientation of the portable communication device, and outputs measurement results, the sensor having output characteristics causing the measurement results to vary in response to one or more sources of ambient interference within a given place of use of the portable communication device; and
   the information processing device comprises:
      a section for acquiring the measurement results of the sensors from the communicatively-connected portable communication devices;
      a calibration section for executing calibration of the sensors by using the acquired measurement results;
      an application execution section for executing an application program that receives the measurement results of the sensors as user-initiated inputs for manipulating outcomes of the application program during execution of the application program;
      a flag information storing section for storing respective flag information when the calibration section executes the calibration, each flag information indicating whether or not the information processing device has executed the calibration for respective ones of the plurality of portable communication devices, and the flag information storing section storing the respective flag information in a storage unit in association with the respective portable communication devices: and
      a determination section for performing respective determinations as to whether or not the calibration section has executed the calibration for respective ones of the plurality of portable communication devices by referencing the respective flag information in the storage unit, the respective determinations being made at a time after the application execution section opens and starts executing the application program and before the application program receives the measurement results of the sensors as the user-initiated inputs for manipulating outcomes of the application program during execution.

2. The information processing system according to claim 1, wherein:
   the information processing device further comprises a connection destination information acquisition section for acquiring connection destination information necessary to establish a respective communicative connection to each of the portable communication devices;
   the flag information storing section stores the respective flag information in the storage unit when the connection destination information acquisition section acquires the respective connection destination information on the portable communication devices; and
   the connection destination information acquisition section reacquires one or more of the connection destination information on one or more of the portable communication devices in a case where the information processing device is again to establish a respective communicative connection to the one or more portable communication devices after the one or more portable communication devices have been communicatively connected to another information processing device.

3. The information processing system according to claim 1, wherein the determination section performs the determination when the application execution section newly starts execution of the application program.

4. The information processing system according to claim 1, wherein the determination section performs the respective determinations when the respective communicative connections to the respective portable communication devices start to be established while the application execution section executes the application program.

5. The information processing system according to claim 1, wherein:
   each of the plurality of portable communication devices further comprises a section for receiving, when the calibration section executes the calibration, device identification information that identifies the information processing device that has executed the calibration from the information processing device and storing the device identification information; and
   the determination section uses the device identification information stored in the communicatively-connected portable communication device to perform the determination.

6. An information processing device for indoor use, which is communicatively connectable to a plurality of portable communication devices, each of the plurality of portable communication devices comprising a sensor that measures an orientation of the portable communication device, and outputs measurement results, the sensor having output characteristics causing the measurement results to vary in response to one or more sources of ambient interference within a given place of use of the portable communication device, comprising:
- a section for acquiring the measurement results of the sensors from the communicatively-connected portable communication devices;
- a calibration section for executing calibration of the sensors by using the acquired measurement results;
- an application execution section for executing an application program that receives the measurement results of the sensors as user-initiated inputs for manipulating outcomes of the application program during execution of the application program;
- a flag information storing section for storing respective flag information when the calibration section executes the calibration, each flag information indicating whether or not the information processing device has executed the calibration for respective ones of the plurality of portable communication devices, and the flag information storing section storing the respective flag information in a storage unit in association with the respective portable communication devices; and
- a determination section for performing respective determinations as to whether or not the calibration section has executed the calibration for respective ones of the plurality of portable communication devices by referencing the respective flag information in the storage unit, the respective determinations being made at a time after the application execution section opens and starts executing the application program and before the application program receives the measurement results of the sensors as the user-initiated inputs for manipulating outcomes of the application program during execution.

7. A portable communication device, which is communicatively connectable to an information processing device for indoor use, comprising:
- a sensor that measures an orientation of the portable communication device, and outputs a measurement results, the sensor having output characteristics causing the measurement results to vary in response to one or more sources of ambient interference within a given place of use of the portable communication device; and
- a section for receiving calibration data from the information processing device and storing the calibration data, the calibration data being generated by the information processing device executing calibration by using the measurement results of the sensor, wherein:
- the portable communication device is subjected to determination as to whether or not the calibration data generated by the information processing device is stored in the portable communication device when the information processing device executes an application program that uses the measurement result of the sensor as user-initiated inputs for manipulating outcomes of the application program during execution of the application program,
- the information processing device includes a flag information storing section for storing respective flag information when the calibration section executes the calibration, each flag information indicating whether or not the information processing device has executed the calibration for respective ones of a plurality of portable communication devices, of which the portable communication device is one, and the flag information storing section storing the respective flag information in a storage unit in association with the respective portable communication devices; and
- the information processing device includes a determination section for performing respective determinations by referencing the respective flag information in the storage unit, the respective determinations being made at a time after the application execution section opens and starts executing the application program and before the application program receives the measurement results of the sensors as the user-initiated inputs for manipulating outcomes of the application program during execution.

8. A control method for an information processing device for indoor use, which is communicatively connectable to a plurality of portable communication devices, each of the plurality of portable communication devices comprising a sensor that measures an orientation of the portable communication device, and outputs measurement results, the sensor having output characteristics causing the measurement results to vary in response to one or more sources of ambient interference within a given place of use of the portable communication device, comprising:
- acquiring the measurement results of the sensors from the communicatively-connected portable communication devices;
- executing calibration of the sensors by using the acquired measurement results;
- executing an application program that receives the measurement results of the sensors as user-initiated inputs for manipulating outcomes of the application program during execution of the application program;
- storing respective flag information when executing calibration, each flag information indicating whether or not the information processing device has executed the calibration for respective ones of the plurality of portable communication devices, and storing the respective flag information in a storage unit in association with the respective portable communication devices: and
- performing respective determinations as to whether or not calibration has been executed for respective ones of the plurality of portable communication devices by referencing the respective flag information in the storage unit, the respective determinations being made at a time after executing the application program starts and before the application program receives the measurement results of the sensors as the user-initiated inputs for manipulating outcomes of the application program during execution.

9. A non-transitory computer-readable information storage medium having a program stored therein, the program controlling an information processing device for indoor use, which is communicatively connectable to a plurality of portable communication devices, each of the plurality of portable communication devices comprising a sensor that measures an orientation of the portable communication device, and outputs a measurement results, the sensor having output characteristics causing the measurement results to vary in response to one or more sources of ambient interference within a given place of use of the portable communication device, to function as:
- a section for acquiring the measurement results of the sensors from the communicatively-connected portable communication devices;

a calibration section for executing calibration of the sensors by using the acquired measurement results;

an application execution section for executing an application program that receives the measurement results of the sensors as user-initiated inputs for manipulating outcomes of the application program during execution of the application program;

a flag information storing section for storing respective flag information when the calibration section executes the calibration, each flag information indicating whether or not the information processing device has executed the calibration for respective ones of the plurality of portable communication devices, and the flag information storing section storing the respective flag information in a storage unit in association with the respective portable communication devices; and a determination section for performing respective determinations as to whether or not the calibration section has executed the calibration for respective ones of the plurality of portable communication devices by referencing the respective flag information in the storage unit, the respective determinations being made at a time after the application execution section opens and starts executing the application program and before the application program receives the measurement results of the sensors as the user-initiated inputs for manipulating outcomes of the application program during execution.

* * * * *